United States Patent
Karwowski et al.

(10) Patent No.: US 10,271,571 B2
(45) Date of Patent: Apr. 30, 2019

(54) PRODUCTION OF SHREDDED PRODUCTS WITH INCLUSIONS

(71) Applicant: Intercontinental Great Brands LLC, East Hanover, NJ (US)

(72) Inventors: Jan Karwowski, East Hanover, NJ (US); Barbara E. Baumann, East Hanover, NJ (US); Supapong Siris, East Hanover, NJ (US); Vani Vemulapalli, East Hanover, NJ (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 337 days.

(21) Appl. No.: 14/402,899

(22) PCT Filed: Jun. 5, 2013

(86) PCT No.: PCT/US2013/044207
§ 371 (c)(1),
(2) Date: Nov. 21, 2014

(87) PCT Pub. No.: WO2013/184739
PCT Pub. Date: Dec. 12, 2013

(65) Prior Publication Data
US 2015/0132444 A1    May 14, 2015

Related U.S. Application Data

(60) Provisional application No. 61/655,874, filed on Jun. 5, 2012.

(51) Int. Cl.
*A23L 7/122* (2016.01)
*A23P 30/10* (2016.01)
(Continued)

(52) U.S. Cl.
CPC ............... *A23P 30/10* (2016.08); *A23L 7/122* (2016.08); *A23L 7/135* (2016.08); *A23L 11/05* (2016.08);
(Continued)

(58) Field of Classification Search
CPC ....................................... A23L 7/198
(Continued)

(56) References Cited

U.S. PATENT DOCUMENTS 2,421,216 A * 5/1947 Penty .................. A23L 11/07
426/621
3,892,511 A    7/1975 Farrant et al.
(Continued)

FOREIGN PATENT DOCUMENTS

EP    0431987    2/1992
EP    0538125    7/1997
(Continued)

OTHER PUBLICATIONS

Fast, R.B. et al.; "Breakfast Cereals and How They Are Made"; Jan. 31, 1990, AACC, Minnesota, pp. 35-39, XP002392362.

*Primary Examiner* — Walter A Moore
(74) *Attorney, Agent, or Firm* — Fitch, Even, Tabin & Flannery, LLP

(57) ABSTRACT

A method for making a shredded product having a marbled surface and the resulting product are provided. The method includes partially cooking an uncooked mass in a first cooking process to form a partially cooked mass and then combining the partially cooked mass with an inclusion component to form an inclusion mass. The inclusion mass is cooked in a second cooking process to form a fully cooked mass. The material is shredded to form continuous net-like sheets having a marbled appearance defined by a first portion of the continuous net-like sheets with the low or
(Continued)

non-glutenous material having a first overall color and a second portion of the continuous net-like sheets with the inclusion component having a second overall color different from the first overall color.

8 Claims, 12 Drawing Sheets

(51) Int. Cl.
 *A23L 7/135* (2016.01)
 *A23L 11/00* (2016.01)
 *A23L 19/10* (2016.01)
(52) U.S. Cl.
 CPC ......... *A23L 19/105* (2016.08); *A23V 2002/00* (2013.01)
(58) Field of Classification Search
 USPC ...... D01/101, 102, 125, 128, 129, 130, 199; 426/618–627
 See application file for complete search history.

(56) References Cited

U.S. PATENT DOCUMENTS

| | | | |
|---|---|---|---|
| 3,988,875 A | 11/1976 | Fay | |
| 3,997,684 A | 12/1976 | Willard | |
| 3,998,975 A | 12/1976 | Liepa | |
| 4,005,139 A | 1/1977 | Kortschot | |
| 4,007,292 A | 2/1977 | Shatila | |
| 4,109,012 A | 8/1978 | Bates | |
| RE29,773 E | 9/1978 | Wisdom | |
| 4,246,293 A | 1/1981 | Larson | |
| 4,276,314 A | 6/1981 | Andersen | |
| 4,348,417 A | 9/1982 | Greup | |
| 4,362,754 A | 12/1982 | Wenger | |
| 4,455,321 A | 6/1984 | Glabe | |
| 4,528,202 A | 7/1985 | Wang | |
| 4,650,687 A | 3/1987 | Willard | |
| 4,828,856 A | 5/1989 | Willard | |
| 4,834,996 A | 5/1989 | Fazzolare | |
| 4,873,093 A | 10/1989 | Fazzolare | |
| 5,104,673 A | 4/1992 | Fazzolare | |
| 5,188,859 A | 2/1993 | Lodge | |
| 5,320,858 A | 6/1994 | Fazzolare et al. | |
| 5,464,642 A | 11/1995 | Villagran | |
| 5,464,643 A | 11/1995 | Lodge | |
| 5,500,234 A | 3/1996 | Russo | |
| 5,603,973 A | 2/1997 | Benson | |
| 5,614,237 A * | 3/1997 | Clow ................... | A21C 11/06 425/335 |
| 5,690,982 A | 11/1997 | Fazzolare | |
| 5,731,020 A | 3/1998 | Russo | |
| 5,789,012 A | 8/1998 | Slimak | |
| D401,386 S * | 11/1998 | Boselli ........................ | D1/129 |
| 5,853,783 A * | 12/1998 | Rijkaart ................... | A21D 8/02 264/70 |
| 5,916,616 A | 6/1999 | Kuwada | |
| 5,997,935 A | 12/1999 | Diamond | |
| 6,235,333 B1 | 5/2001 | Martines-SernaVillagran | |
| 6,251,465 B1 | 6/2001 | Bello | |
| 6,479,090 B1 | 11/2002 | Carey | |
| 6,521,281 B2 | 2/2003 | Villagran | |
| 6,558,730 B1 | 5/2003 | Gisaw | |
| 6,599,550 B2 | 7/2003 | Merchant | |
| 6,808,534 B1 | 10/2004 | Escano | |
| 6,808,734 B2 | 10/2004 | Barbano | |
| 7,141,257 B2 | 11/2006 | Malfait | |
| D571,978 S * | 7/2008 | Yusufov ........................ | D1/129 |
| 7,553,508 B1 | 6/2009 | Wainwright | |
| 7,820,223 B2 | 10/2010 | Bhaskar | |
| 2001/0055643 A1 | 12/2001 | Villagran | |
| 2002/0142085 A1 | 10/2002 | Villagran | |
| 2002/0155207 A1 | 10/2002 | Villagran | |
| 2003/0017253 A1 | 1/2003 | Villagran | |
| 2003/0104115 A1 | 6/2003 | Villagran | |
| 2003/0113431 A1 | 6/2003 | Villagran | |
| 2003/0138541 A1 | 7/2003 | Villagran | |
| 2005/0202142 A1 | 9/2005 | Bosch | |
| 2005/0226981 A1 | 10/2005 | Flook | |
| 2006/0246195 A1 | 11/2006 | Karwowski | |
| 2006/0246202 A1 | 11/2006 | Karwowski | |
| 2006/0286242 A1 | 12/2006 | Villagran | |
| 2009/0087527 A1 | 4/2009 | Belanger | |
| 2009/0130292 A1 | 5/2009 | Bhaskar | |
| 2009/0226591 A1 | 9/2009 | Frazee | |
| 2010/0215826 A1 | 8/2010 | Campbell | |
| 2010/0247717 A1 | 9/2010 | Whitham | |
| 2011/0256293 A1 | 10/2011 | Palta | |
| 2012/0058227 A1 * | 3/2012 | Keehn .................. | A01K 15/026 426/93 |
| 2013/0273209 A1 * | 10/2013 | Baier ..................... | A21D 13/00 426/72 |
| 2014/0322392 A1 * | 10/2014 | Haskins .................. | A21D 2/36 426/94 |

FOREIGN PATENT DOCUMENTS

| | | |
|---|---|---|
| EP | 1043940 | 4/2003 |
| EP | 2042042 | 4/2009 |
| JP | 60168361 | 8/1985 |
| JP | 01063340 | 3/1989 |
| JP | 08332018 | 12/1996 |
| JP | 10257852 | 9/1998 |
| JP | 11206318 | 8/1999 |
| JP | 2005143387 | 6/2005 |
| JP | 2007135462 | 6/2007 |
| WO | 8704599 | 8/1987 |
| WO | 9934682 | 7/1999 |
| WO | 06135714 | 4/2007 |
| WO | 06091299 | 10/2007 |
| WO | 2009122900 | 10/2009 |
| WO | 2013056081 | 4/2013 |

* cited by examiner

Brown Rice/Wheat

Brown Rice/Wheat/Sweet Potato

Brown Rice/Wheat/Sweet Potato

Brown Rice/Wheat/Red Bean

Brown Rice/Wheat/Red Bean

PRODUCTION OF SHREDDED PRODUCTS WITH INCLUSIONS

CROSS-REFERENCE TO RELATED APPLICATIONS

This application is the National Stage of International Application Number PCT/US2013/044207, filed Jun. 5, 2013, which claims priority benefit of U.S. Provisional Application No. 61/655,874, filed Jun. 5, 2012. International Application Number PCT/US2013/044207 and U.S. Provisional Application No. 61/655,874 are hereby incorporated by reference in their entireties.

FIELD

The present disclosure relates to a process for the production of shredded products, such as snacks and ready-to-eat cereals from whole grain brown rice with inclusions and the resulting products.

BACKGROUND

Whole grains are nutritious and provide high dietary fiber content. Shredded products have been historically made with whole grain wheat. Generally, in the production of shredded wheat, ready-to-eat cereal biscuits, and shredded wheat wafers from whole grains, a plurality of shredded layers are laminated upon one other, and the laminate is cut, dockered, and baked to provide products having a distinctly visible shred pattern on their opposing major surfaces. The shreds provide visual attractiveness and a unique, crispy texture and connote a healthy, hearty, natural product. Also, the shreds may provide increased surface area and deliver a robust flavor.

Wheat is often shredded because it has a composition that lends itself to be easily cooked, cooled, and shredded. To prepare wheat for shredding, whole wheat berries are generally immersion cooked in water and then cooled and tempered, using prolonged tempering times. Wheat is generally easy to shred over long periods after the cooking and tempering, for example up to about 24 hours after tempering. Whole wheat is unique in that it contains gluten that helps to retain water and to provide cohesiveness and elasticity during machining even after prolonged periods after tempering. However, the same is not true for other grains because of their lack of gluten and their unique chemical composition and changes that happen to the grains after cooking and tempering.

Starch-based compositions, which have little or no gluten, when mixed with water, tend not to form a material that is cohesive at room temperature and may not be continuously machinable or sheetable. Machinability of material made from ingredients having little or no gluten may be improved by forming the material under elevated temperature conditions, such as by steaming the ingredients. However, in the production of shredded products from cooked, tempered, non-glutenous and low gluten whole grains such as corn, oats, rice, and barley, or their combinations shreddability into long continuous shreds tends to decrease as tempering times increase or as the time between tempering and shredding increases. For example, cooked corn has a tendency to become hard and rubbery during the cooling and tempering process due, it is believed, to starch retrogradation. Also, storing of tempered low or no gluten grains in surge bins to accommodate mass production processes tends to increase starch retrogradation and hardness. The cooked, tempered grains which become hardened or rubbery, tend to fracture during shredding or do not conform to shredding roll grooves for producing continuous, well-defined shredded net-like sheets.

In conventional processes for producing shredded cereals, the grain is cooked and then permitted to temper to increase shred strength. Tempering of the cooked grains prior to shredding has generally been considered necessary for obtaining strong, continuous shreds. Cooked wheat or similar gluten containing grains are subjected to tempering times of over 12 hours before shredding. In the manufacture of a whole wheat food product such as shredded wheat, whole wheat is cooked sufficiently to gelatinize the starch. Gelatinization is a function of water penetration into the whole berry, temperature, and time, for a given type of grain. The gelatinization of wheat starch involves a destruction of bonds in the crystalline regions of starch granules. Retrogradation is the return of the starch molecules to a crystalline structure, which is different from the original crystalline structures, upon cooling. Tempering permits the gelatinized wheat starch to slowly cool and permits water migration through the wheat particles to achieve a uniform moisture distribution within the particles. Retrogradation occurs during tempering. If shredding is attempted shortly after cooking, the insufficient degree of retrogradation or tempering results in at best, short non-continuous strands and/or strands which are strong, curly, or suffer from other physical or textural disadvantage. In some cases, the time required for the tempering of cooked whole wheat is substantially reduced by cooling the wheat at a temperature of from 60° F. to about 70° F.

It is believed that for wheat, the tempering permits distribution of water and facilitates development of the gluten into a network which provides cohesiveness for shredding. It is also believed that the retrogradation of wheat starch during tempering or after tempering is slow so as not to impede shredding or it forms a crystalline structure which permits shredding in the presence of gluten. Tempering of non-glutenous and low gluten grains, such as corn, oats, rice, and barley also helps to distribute water throughout the starch granules. It is believed that release of some soluble starch during cooking and distribution of the starch and water during tempering helps to provide cohesiveness. However, the amount released may be insufficient for continuous shreddability or the starch retrogradation may be too rapid and may provide a crystalline structure which impedes shreddability into long continuous shreds.

Further, there has been increasing interest in providing foods with combinations of ingredients, flavors and textures. For example, traditional foods such as crackers oftentimes have a generally uniform appearance. In view of this, consumers often look for variations in product appearance when seeking to try new products. However, when incorporating additional components to modify the texture and/or appearance of a product, such as a cracker, traditional processing steps can result in detrimental effects on the strength and/or flavor of the resulting product. For example, shredded wheat crackers are oftentimes cooked in a pressure cooking stage. If additional components are added at the start of the pressure cooking stage, the additional components may denature or otherwise break down or become excessively overcooked or sticky.

Additionally, consumers have been looking for snacks that provide more natural food ingredients while still providing the taste and appearance of a snack food. Such snack foods may provide, for example, the sweet and/or savory flavors of traditional snacks or crackers while providing more natural ingredients that some consumers may interpret as being more "wholesome" when compared with other snacks.

SUMMARY

In one form, a method for making a shredded product having a marbled surface and the resulting product are provided. The method includes the steps of: combining water and a low or non-glutenous component to form an uncooked mass; partially cooking the uncooked mass in a first cooking process to form a partially cooked mass; combining the partially cooked mass with an inclusion component to form an inclusion mass; cooking the inclusion mass in a second cooking process to form a fully cooked mass; tempering the fully cooked mass for about 0 to about 240 minutes to form a tempered material; and shredding the tempered material to form continuous net-like sheets having a marbled appearance defined by a first portion of the continuous net-like sheets with the low or non-glutenous material having a first overall color and a second portion of the continuous net-like sheets with the inclusion component having a second overall color different from the first overall color.

According to one form, at least one of the first and second cooking processes are pressure cooking processes.

In accordance with any of the above forms, the low or non-glutenous component includes whole grain brown rice and the inclusion component includes at least one of whole red beans and whole pieces of sweet potatoes.

In accordance with any of the above forms, the inclusion component includes at least one of legumes, beans, tuber vegetables, and fruit.

In accordance with any of the above forms, the method further includes the steps of layering and baking the continuous net-like sheets to form the shredded product having multiple layers.

In accordance with any of the above forms, the method further includes pelletizing the fully cooked mass.

In accordance with any of the above forms, the first and second cooking processes are both pressure cooking processes and wherein pressure is exhausted between the first and second cooking processes.

In accordance with any of the above forms, the inclusion mass is mixed to disperse the inclusion component in the partially cooked mass before re-pressurizing for the second cooking process.

In accordance with one form, a shredded product having a marbled surface is provided. The shredded product includes a body having a top surface and a bottom surface with the body being defined by at least one net-like sheet. The at least one net-like sheet includes a low or non-glutenous component having a first overall color and an inclusion component having a second overall color different from the first overall color. The at least one net-like sheet is defined by interconnected strands formed by one of the low or non-glutenous component, the inclusion component, and combinations thereof such that at least one of the interconnected strands provides a marbled appearance on at least one of the top and bottom surfaces by a combination of the low or non-glutenous component and the inclusion component on the same strand.

In accordance with any of the above forms, the low or non-glutenous component includes whole grain brown rice.

In accordance with any of the above forms the inclusion component includes at least one of legumes, beans, tuber vegetables, and fruit.

In accordance with any of the above forms, the inclusion component includes a whole form of at least one of legumes, beans, tuber vegetables, and fruit such that the product includes at least one generally contiguous inclusion extending along a portion of at least one or more of the interconnected strands.

In accordance with any of the above forms, the at least one net-like sheet includes an upper net-like sheet, a lower net-like sheet and at least one intermediate net-like sheet between the upper and lower net-like sheets.

In accordance with any of the above forms, each of the upper, lower and intermediate net-like sheets includes interconnected strands of the low or non-glutenous material and the inclusion material.

In accordance with any of the above forms, the inclusion is a contiguous inclusion extending along a surface of and internally to one of the interconnected strands.

In accordance with any of the above forms, the contiguous inclusion extends internally to the interconnected strand and is exposed on more than one surface portion of the interconnected strand.

In accordance with any of the above forms, the interconnected strands include at least two interconnected strands positioned transverse to each other and wherein the inclusion component contiguously extends in at least a portion of both transverse interconnected strands.

In accordance with any of the above forms, the low or non-glutenous component includes whole grain brown rice and the inclusion component includes at least one of whole red beans and whole pieces of sweet potatoes.

DETAILED DESCRIPTION

Figure 1:
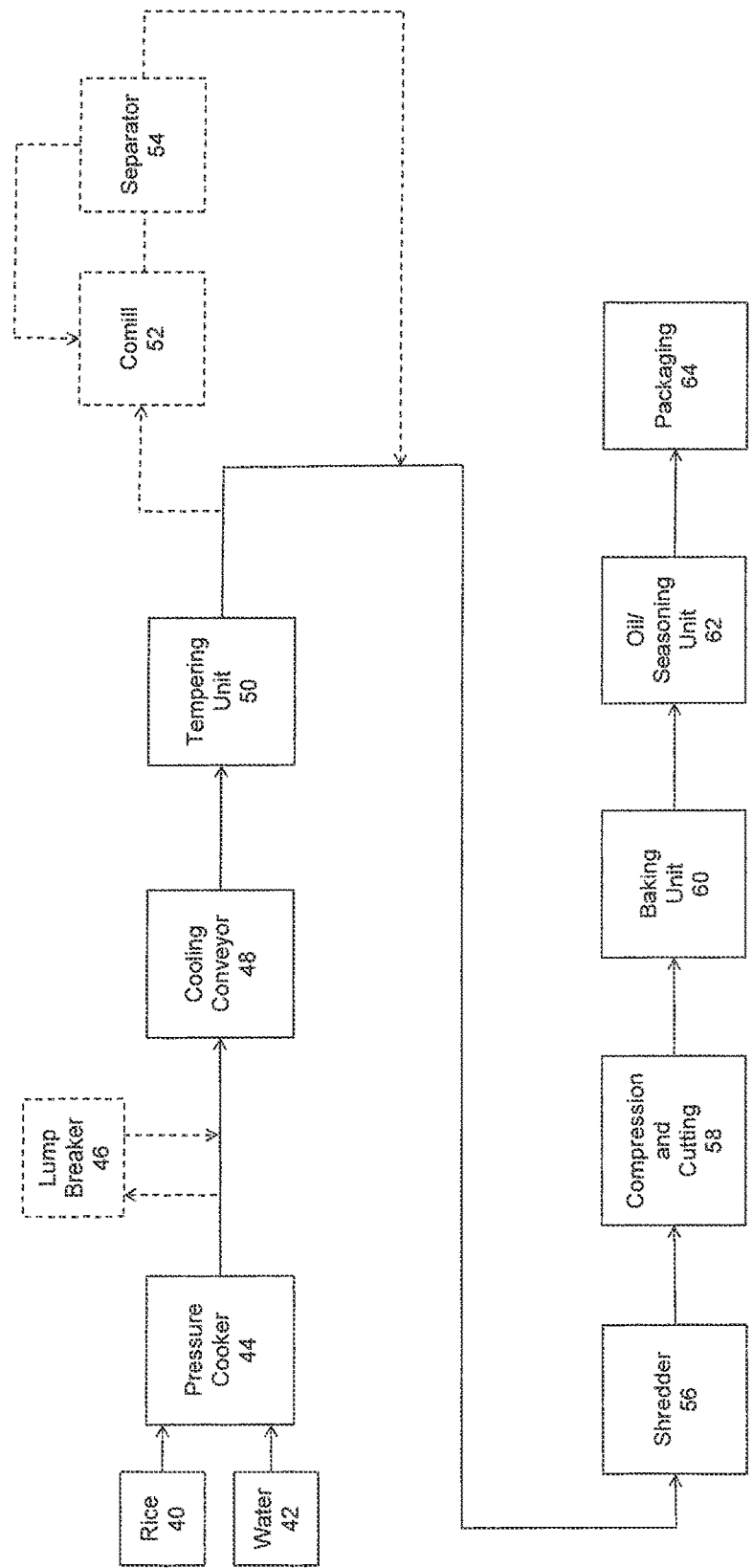
FIG. 1 is a flow chart providing an exemplary method of producing a whole grain brown rice shredded product.

The present disclosure provides a method for making shredded whole grain products, such as ready-to-eat cereals, and sweet and savory snacks, such as chips, crackers, wafers, biscuits, and other products made using brown rice, wheat, barley, oats, sorghum, rye, triticale, millets, buckwheat or multi-grains. In one aspect, it has been discovered that certain combinations of processing conditions and parameters may be effective to enable the whole grain brown rice, which has low levels of gluten, to be easily shred.

For example and by one approach, it is believed that certain cooling temperatures after cooking in combination with certain tempering times and temperatures may be effective in combination to enable the whole grain brown rice to be in a form suitable for shredding. By other approaches, it has been discovered that certain post baking and final textures of the whole grain brown rice products may be desired, and may be indicative of process parameters and conditions effective to achieve desired results and shreddability when using whole grain brown rice as a base ingredient. For example, a final product texture of about 700 to about 5500 gmf (Texture Analyzer TA-XT2) provides a suitable shredded product. In another form, a final product texture of about 1500-5500 gmf provides a suitable shredded product. To achieve such final texture, it has been discovered that process variables may need to be carefully controlled. In one approach, certain post-baking or intermediate textures in combination with certain oil ratios may be effective to achieve the desired results. For example, a post-baking texture or intermediate texture effective to achieve the desired results is generally from about 700 to about 5500 gmf and, subsequent to baking, an oiling application and certain oil ratios may be effective to achieve the final target texture range of about 700 to about 5500 gmf. In other forms, the texture may be from about 1500 to about 5500 gmf and, after baking, a final texture of about 1000 to about 5000 gmf. Additionally, adding oil in the cooker may also help to lower the texture of the final product.

In yet another approach, cooking aides, such as disodium phosphate, calcium hydroxide, and oils or emulsifiers, may be employed in the cooking step to enhance cooking when using whole grain brown rice. The disodium phosphate may enable faster cooking times, and the oil may be used as an anti-sticking agent. In other embodiments, the whole grain brown rice may be ground or may be unground as needed for particular applications.

According to one approach, brown rice may be combined with wheat. Wheat can be any kind, including soft, hard, durum wheat or other cultivars of wheat. In this regard, the composition will include less than 100% brown rice. In other approaches, the composition, except for any topical applications and inclusions, will be about 100% brown rice.

In some embodiments, it is believed that the process variables effective to achieve the desired final product texture when using a brown rice as a starting material may be as follows:

TABLE 1

| Process variables. | |
|---|---|
| Variable | Value |
| Pressure cook | 8-20 psi |
| Moisture | 28-37% |
| Cooking time | 10-40 min |

TABLE 1-continued

| Process variables. | |
|---|---|
| Variable | Value |
| Temperature after cooling | 70-100° F. |
| Tempering time | 0-240 min |
| Baking temperature | 350-550° F. |
| Post-baking moisture | 0.5-3.5% |
| Post-baking texture (TA-XT2) | 700-5,500 gmf |
| Topical oil, % | 5-15% |
| Post-oiling texture (TA-XT2) | 500-5200 gmf |

In another form, process variables as found in Table 2 below may be utilized:

TABLE 2

| Process variables. | |
|---|---|
| Variable | Value |
| Pressure cook | 5-25 psi |
| Moisture | 28-42% |
| Cooking time | 10-60 min |
| Temperature after cooling | 70-100° F. |
| Tempering time | 0-120 min. (without pelletizing) |
| | 0-240 min. (with pelletizing) |
| Baking temperature | 350-550° F. |
| Post-baking moisture | 0.5-4.5% |
| Post-baking texture (TA-XT2) | 1500-5,500 gmf |
| Topical oil, % | 5-15% |
| Post-oiling texture (TA-XT2) | 1000-5000 gmf |

In other aspects, it has been discovered that a combination of process cook pressure and particular seasoning types may also result in the most desired products in some applications. By one approach, low cook pressures, such as about 5 to about 25 psi (in other approaches, about 8 to about 20 psi and in yet other approaches 12 psi) in combination with a sea salt and black pepper seasoning was effective to form the most desired products when shredding whole grain brown rice into shredded snacks. The shredded product may include between 2 and 6 layers, but may contain more or less depending on the particular applications.

The whole grain brown rice employed may be preferable raw. In some cases, the starch of the whole grain brown rice employed may be all or essentially all individual, crystalline starch granules, as determined by light microscopy starch characterization where a sample is stained with Lugol's Iodine and observed in Brightfield Optics.

Optionally, whole seeds or comminuted seeds or legumes, such as soy beans or soy bean grits may be admixed with the whole grain brown rice as an inclusion to enhance fiber and protein content so long as the amount does not adversely affect shreddability. Exemplary amounts of the seeds, legumes or other inclusions that may be employed may range up to about 60% by weight, based upon the total weight of the whole grain brown rice. In other approaches, the composition may include about 1 to about 20% inclusions, in other approaches about 1 to about 15%, and in yet other approaches, about 2 to about 10% of each inclusion type.

The shredded whole grain brown rice foods such as ready-to-eat cereals, crackers, wafers, biscuits, or snack chips may be full-fat, reduced-fat, low-fat, or no-fat products. As used herein, a reduced-fat food product is a product having its fat content reduced by at least about 25 percent by weight from the standard or conventional product. A low-fat product has a fat content of less than or equal to three grams of fat per reference amount or label serving. However, for small reference amounts (that is, reference amounts of about 30 grams or less or two tablespoons or less), a low-fat product has a fat content of less than or equal to about 3 grams per about 50 grams of product. A no-fat or zero-fat product has a fat content of less than about 0.5 grams of fat per reference amount and per label serving. For accompaniment crackers, such as a saltine cracker, the reference amount is 15 grams. For crackers, or biscuits or wafers, used as snacks, and for cookies, the reference amount is about 30 grams. Thus, the fat content of a low-fat cracker, wafer, or cookie would therefore be less than or equal to about 3 grams of fat per about 50 grams or less than or equal to about 6 percent by weight fat, based upon the total weight of the final product. A no-fat accompaniment cracker would have a fat content of less than about 0.5 grams per about 15 grams or less than about 3.33 percent by weight, based upon the weight of the final product. A no-fat wafer having a label serving size of about 32 grams would have a fat content of less than about 0.5 grams per about 32 grams or less than about 1.56 percent by weight, based upon the weight of the final product.

If desired, oleaginous compositions which may be used in producing full-fat, reduced-fat, or low-fat shredded products in accordance with the present disclosure may include any known shortening or fat blends or compositions useful for baking or frying applications, and they may include conventional food-grade emulsifiers. Vegetable oils, lard, marine oils, and mixtures thereof, which are fractionated, partially hydrogenated, and/or interesterified, are exemplary of the shortenings or fats which may be used. Edible reduced- or low-calorie, partially digestible or non-digestible fats, fat-substitutes, or synthetic fats, such as sucrose polyesters or triacyl glycerides, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions include naturally occurring triglycerides derived from vegetable sources such as soybean oil, palm kernel oil, palm oil, canola oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Examples of oleaginous compositions that could be used include partially hydrogenated soybean oil, palm oil, and mixtures thereof.

In any of the approaches herein, the amount of vegetable shortening or fat optionally topically applied to shredded products may be reduced by more than about 25 percent by weight to obtain reduced fat products having, for example, less than about 12 weight percent fat, preferably less than about 10 percent by weight fat, based on the total weight of the baked or fried, finished product.

To provide a more lubricious mouthfeel to reduced fat, low-fat or no-fat products, a hydrocolloid gum, such as guar gum, may be employed in any of the approaches to compensate for the fat reduction as disclosed in U.S. Pat. No. 5,595,774 to Leibfred et al., the disclosure of which is herein incorporated by reference in its entirety. If used, the hydrocolloid gums could be added in effective amounts that provide a lubricous, smooth, non-slippery mouthfeel to the baked or fried product. Exemplary amounts of the hydrocolloid gum, such as guar gum, that may be used range from about 0.15 percent by weight to about 1.5 percent by weight, in other cases, from about 0.25 percent by weight to about 0.45 percent by weight, based upon the total weight of the whole berries or grains. Other gums that may be used with guar gum include xanthan gum and carboxymethyl cellulose, and gums which form gels such as alginate gum, carrageenan gum, gum arabic, gum tragacanth, pectin, and locust bean gum, and mixtures thereof. Generally, the greater the extent of shortening or fat reduction, the greater the amount of gum utilized to compensate for the loss of lubricity or loss of smoothness in mouthfeel.

Turning to FIG. 1, a whole grain shredded brown rice food product may be produced continuously on a mass production basis by admixing whole grain brown rice 40 with water 42 and pressure cooking (with steam) the whole grain particles, such as in pressure cooker 44, to at least substantially gelatinize starch of the whole grain brown rice. It should be noted that other materials may also be added, such as oil (not shown). In one form, the pressure cooker is at a pressure of about 5 to about 25 psi and the materials are cooked for about 25 to about 60 minutes.

Next, the cooked rice may optionally be passed through a lump breaker 46 before it is co-milled, cooled, and tempered. The lump breaker 46 may be used to break up any agglomerates from the pressure cooker 44.

Figure 2:
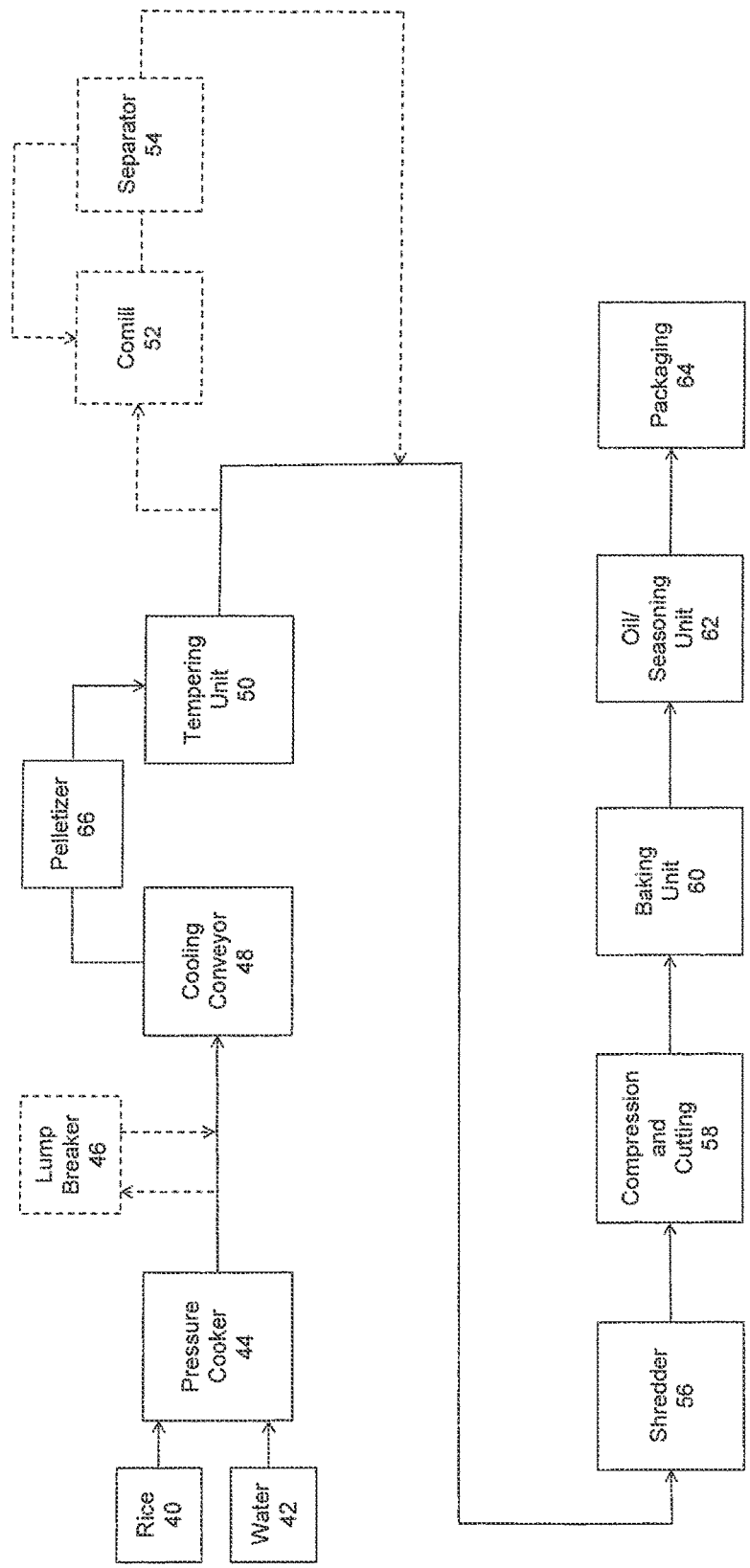
FIG. 2 is a flow chart providing an alternative, exemplary method of producing a whole grain brown rice shredded product.

After de-lumping and/or co-milling, the rice is preferably cooled to a temperature ranging from about 70° F. to about 100° F. Any standard cooling equipment or methods can be used. For example, the cooked rice may be cooled, such as by being passed along a cooling conveyor 48, and then tempered in a tempering unit 50. Further, as shown in FIG. 2, the process may also include a pelletizer 66, which can be utilized prior to the tempering unit 50.

The tempered, cooked, whole grain rice may optionally be mechanically sheared, worked or compacted to soften and plasticize its starch matrix, which it is believed the friction and heat may make the whole grain rice softer and more pliable. Examples of suitable optional shearing or working may be completed using a forming extruder, or other high shear mixer to impart a high level of shear to the product. In one form, a forming extruder may be used in order to obtain whole grain brown rice formed pieces, extrusion being under pressure and temperature conditions to provide continuous shreddability of the whole grain formed pieces into continuous net-like sheets. The whole grain brown rice or rice formed pieces may be shredded into whole grain net-like sheets, followed by laminating the whole grain net-like sheets to obtain a whole grain laminate.

The whole grain rice or rice formed pieces may be transferred from the tempering unit 50 to an optional comill 52 and an optional separator 54 before shredding. In one form, the comill 52 may include 1" screen to break up large agglomerates. Further, in one form, the separator 54 may be a rotary separator which can be used to make a final size reduction of the agglomerates prior to shredding. If the agglomerates are still too large exiting the separator, they may be passed back to the comill 52. The co-milled agglomerates may range in size from about golf-ball sized to granular sized, preferably less than about 0.5 cm in diameter.

After tempering, and optional comilling and separating, the rice is shredded, such as in shredder 56. Shredder 56 may include, in one form, 2-6 shredding rolls to achieve the desired number of layers of material. The shredder 56 may shred the rice into whole grain net-like sheets.

The shredded material may also be compressed together, such as in compression and cutting 58 to form a whole grain laminate. The compression and cutting 58 may include dockering wheels and structure to slit and score the whole grain laminate into a desired shape.

The cut pieces may then be further processed by baking or frying the whole grain pieces in a baking unit 60 to obtain a baked or fried whole grain shredded food product. The cut, whole grain laminate may be baked, fried, and/or toasted in conventional equipment. The baked or fried whole grain shredded food product may then be oiled and seasoned to provide the desired final product texture, such as in oiling/seasoning unit 62. It should be noted that the oiling/seasoning unit 62 may take the form of multiple units or a single unit, depending on if oil and seasoning are both being applied and how they are being applied. Finally, the product may be passed on to a packaging unit 64 for final packaging. After baking or frying and before or after oil or seasoning addition to the strips, the conveyor movement, etc., breaks apart the scored strips to provide individual pieces of shredded product such as ready-to-eat cereals, biscuits, wafers, or chip-like snacks.

Figure 3:
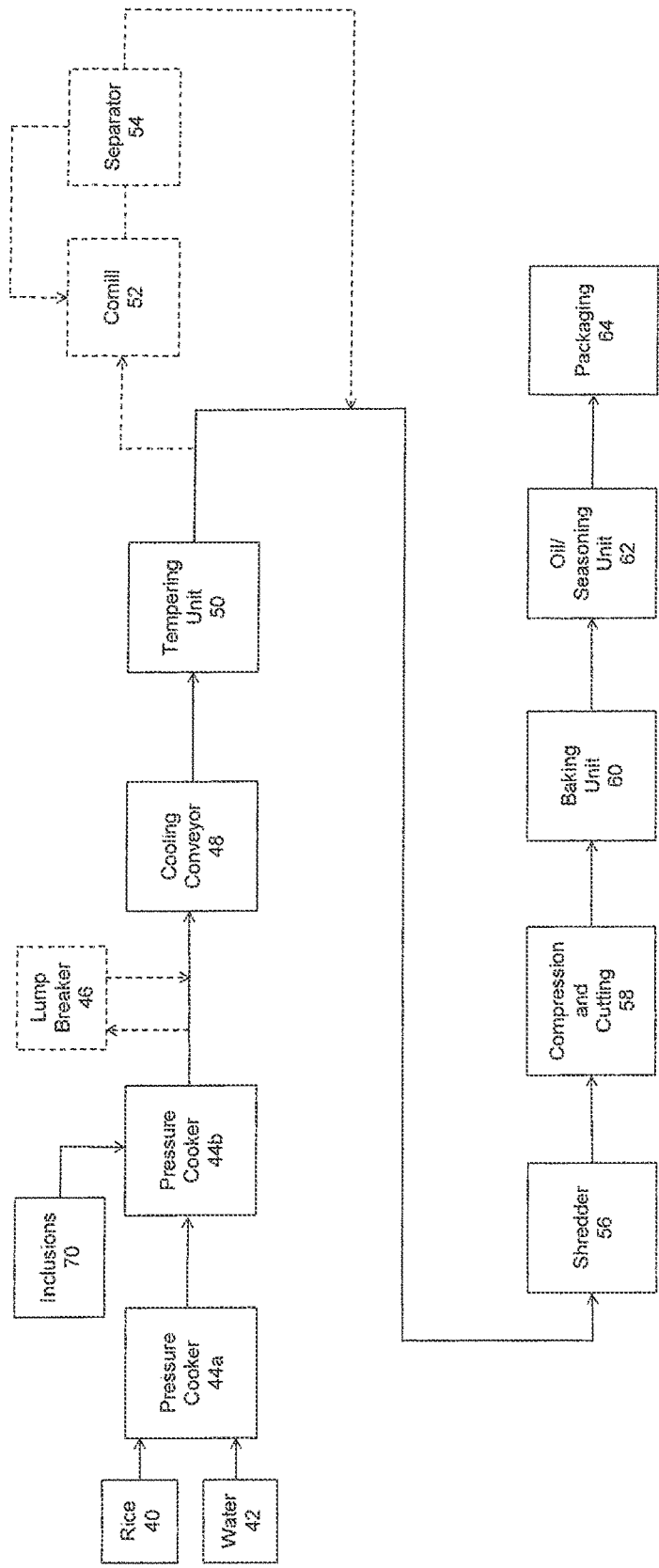
FIG. 3 is a flow chart providing a further alternative, exemplary method of producing a shredded product.

In yet another form, such as shown in FIG. 3, the process may include a multi-stage pressure cooking operation 44a and 44b in place of a single stage operation as in FIGS. 1 and 2. For example, the process may include a two-stage pressure cooking operation which can be carried out in a single pressure cooker unit or in multiple units. In this regard, certain ingredients, such as whole grain brown rice and/or wheat may be combined in a first pressure cooking stage. In the first stage, the composition is cooked for about 10 to about 30 minutes at an elevated pressure of about 5 to about 25 psi. After cooking, the pressure from the first pressure cooking stage is exhausted. Next, the composition goes to a second stage pressure cooking stage whereby vegetables and other inclusion materials such as sweet potato and/or red beans (raw or pre-cooked; used as whole or ground in various particle sizes) are combined with the rice and/or wheat from the first stage and then mixed. These materials can be added via inclusions 70, as shown in FIG. 3. The components can be mixed in a variety of manners, such as if the cooker is a rotating cooker. Mixing prior to repressurization and further pressure cooking is advantageous because it reduces and, in some cases, limits agglomeration of the inclusions that may occur when pressurization commences. The mixed composition is then repressurized and cooked for about 3 to about 15 minutes under pressure, such as at an elevated pressure from about 5 to about 25 psi.

These materials are added at the second stage of cooking and not the first stage to avoid overcooking and otherwise degrading the vegetables and legumes. For example, if the red beans and or sweet potatoes were added prior to the first cooking process, the red beans and or sweet potatoes would break down and otherwise become overly macerated in the composition and may not provide the desired marbled appearance in the final product. It should be noted that other legumes, vegetables and fruits may also be used as will be described below in more detail.

In either case, the whole grain brown rice laminate may be cut into whole grain pieces, followed by baking or frying the whole grain pieces to obtain a baked grain shredded food product. The baked grain shredded food product is then oiled and seasoned to provide the desired final product texture. In embodiments where a thin, chip-like shredded snack is produced, the whole grain laminate may be substantially compressed to obtain a compressed laminate having a shredded net-like appearance, followed by cutting the compressed laminate into pieces and baking or frying of the pieces. The finished product exhibits crispy-crunchy texture and resistance to breakage.

The cooking of the brown rice or other whole grains can be done in any standard cooking equipment, such as a rotary cooker, immersion cooker, or pressure cooker, such as a Lauhoff pressure cooker. Pressure cooking is preferred because it quickly achieves full cooking or gelatinization of the whole grain particles with no, or essentially no white centers. The brown rice may be cooked at effective temperatures, pressures, and humidities that hydrate and at least substantially gelatinize the internal structure of the brown rice such that only a pin head of white or free starch remains visible in the center of the kernel. The degree of gelatinization may for example, be at least 90 percent. In some embodiments, the starch is essentially 100 percent gelatinized leaving no visible white centers in the whole grain particles. The degree of starch gelatinization may be measured by Differential Scanning calorimetry (DSC). Gelatinization may be defined as the collapse (disruption) of molecular order within the starch granule, manifested in irreversible changes in properties such as granular swelling, native-crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following gelatinization in the dissolution of starch. It involves increased granular swelling, exudation of molecular components (i.e., amylose, followed by amylopectin) from the granules, and eventually, total disruption of the granules. See Atwell et al., "The Terminology And Methodology Associated With Basic Starch Phenomena," Cereal Foods World, Vol. 33, No. 3, pp. 306-311 (March 1988).

By one approach, exemplary pressure cooking pressures of the rice and/or wheat in a single or multi-phase cooking process may range from about 8 psig to about 20 psig with cooking times ranging from about 25 minutes to about 40 minutes in one or all of the phases. In some applications, the pressure cooking may include a "come-up time" as in immersion cooking of between about 6.5 to about 8 minutes during which the temperature of the brown rice in the vat or cooking vessel is elevated from ambient temperature to the cooking temperature. In some cases, before cooking, the brown rice may be admixed with hot water at a temperature of about 170° F. to about 190° F. in the pressure cooker. The brown rice may be added to the hot water, or vice versa, in a rotating cooker, for example, over a time period, for example, of about 50 to about 100 seconds. Other ingredients such as salt, oil, disodium phosphate and calcium hydroxide may be added in the cooker with the water as a pre-blend or added separately. By one approach, about 0.25 percent oil and/or emulsifiers may be added for anti-sticking.

In some cases, pressure cooking may be preferred over immersion cooking because it provides better control over obtaining desired water content in the cooked brown rice and reduces or eliminates the need for drying of the cooked brown rice to achieve desired moisture content for shredding. Generally, in pressure cooking all of the water added is absorbed or taken up by the brown rice. In addition, steam which is directly injected into the pressure cooker condenses and is taken up by the brown rice, for example, generally in an amount of about 1 percent by weight to about 3 percent by weight, based upon the total weight of the cooked whole grain particles. Generally, draining of water after pressure cooking is not needed because all or substantially all of the added water and steam condensate is taken up by the cooked brown rice. The amounts of water uptake may vary depending on the particular application and other conditions. The moisture content of the cooked brown rice, which includes water inherently present in the raw brown rice, after draining if needed, may range from about 28 percent by weight to about 42 percent by weight, and in other forms, about 28 to about 37 percent by weight, based upon the weight of the cooked brown rice.

During cooking, moisture tends to collect on the rice. This moisture can increase the stickiness of the cooked brown rice and can cause handling problems when the brown rice is transferred to other apparatus. Mixing the brown rice in the cooking vat at low rotation speeds provides for even cooking and reduces lumping. As mentioned above, oil and/or emulsifiers may be blended to the cooker to minimize stickiness and enhance handling through the shredding process.

In some applications, after draining of any excess cooking water and steam condensate formed during cooking, the cooked brown rice may be discharged from the cooker and optionally transferred to a surface dryer and cooler. In such case, the cooked brown rice may be dried and cooled to a temperature of less than about 135° F., for example from about 70° F. to about 90° F. The surface drying and cooling facilitates flow of the cooked grains as individual, discrete pieces. The dried, cooled brown rice may have a moisture content of from about 26 percent by weight to about 40 percent by weight, and in other approaches about 33 to about 37 percent by weight, for shreddability into strong, continuous shreds.

In some approaches, the cooked whole brown rice may be passed through a lump breaker to break apart large lumps or agglomerates of whole brown rice. The de-lumped whole brown rice may then be co-milled to obtain smaller agglomerates of whole brown rice by passing through a screen, for example a 1 inch square screen. The co-milled agglomerates may range in size from about golf-ball sized to granular sized, preferably less than about 0.5 cm in diameter. After co-milling, the brown rice is preferably cooled to a temperature ranging from about 70° F. to about 100° F. Any standard cooling equipment or methods can be used.

After cooking, the starch granules of the cooked brown rice is no longer crystalline in nature and are swollen or larger in size, as determined by light microscopy starch characterization using Lugol's Iodine. The cooked brown rice may contain swollen granules as well as agglomerated starch clusters.

The cooked whole brown rice particles may then be conveyed to a surge bin or grit bin for tempering. The cooked whole brown rice particles may then be tempered or cured for a sufficient period of time to provide a uniform distribution of the water throughout the cooked whole grain particles. Tempering may be conducted at a temperature from about 70° F. to about 90° F. Tempering times may range from about 0 hours to about 4 hours, such as with pelletizing, and 0 hours to about 2 hours without pelletizing. The tempering or curing step may be accomplished in one or more stages. The tempered whole grain particles may be in agglomerated form, with the agglomerates ranging in size from about golf-ball sized to granular sized, preferably less than about 0.5 cm in diameter.

In embodiments where a hydrocolloid gum is used, the hydrocolloid gum, such as guar gum, in dry, particulate, or powdered form may be admixed or blended with the cooked, tempered brown rice particles. Batch or continuous mixers or blenders can be used to mix the gum and the cooked, tempered brown rice particles or agglomerates to coat them with the gum substantially homogeneously. The dry gum sticks or adheres to the cooked, tempered moist brown rice particles, thus at least partially coating the rice particles without creating a sticky surface which would hamper or interfere with shredding. Upon shredding of the rice particles, the gum coating or particles are incorporated into and onto the individual strands or net-like sheets formed by the shredding rolls.

Optionally, the cooked, tempered whole brown rice may be transferred by means of belt conveyers to a mechanical shearing, working, or compacting operation in order to reverse starch retrogradation if needed. By one approach, an optional extruder/former for forming the whole grain brown rice into formed pieces prior to shredding may be used. Upon entering the forming extruder, the tempered whole grain brown rice may be in the form of agglomerates. The agglomerates fed to the forming extruder may range in size from about golf-ball sized to granular sized, and may preferably be less than about 0.5 cm in diameter. Upon entry into the forming extruder, the tempered, whole grain brown rice may have a hard or rubbery texture. The starch of the tempered whole grain brown rice may be retrograded, with the starch being primarily granular, the starch granules being swollen, and some agglomerated starch clusters being present, as determined using light microscopy starch characterization with Lugol's Iodine.

If used, commercially available forming extruders, such as a Bonnet or a Wenger, may be employed to produce the shreddable, whole grain brown rice formed pieces from the agglomerates of cooked, tempered whole grain brown rice. The forming extruder may be equipped with a solid or cut-flight screw conveyer for conveying and shearing of the tempered whole grain brown rice from the input end to the output end and through the exit die plate. Cooling jackets are preferably provided to control the temperature of the agglomerates in the extruder and to control the temperature of the formed pieces exiting the forming extruder. The cooling jackets help to remove heat generated by the shearing action occurring in the forming extruder and at the die plate as the agglomerates are forced through the die plate apertures.

If used, the forming extruder may be equipped with an internal knife installed on the upstream side of an exit die plate, and an external knife installed on the downstream side of the exit die plate for forming the brown rice agglomerates into a rope or rod which is cut into whole grain formed pieces. The die plate may have a plurality of holes or apertures each having a diameter of about 3/16 inch to about 5/16 inch. The open area of the die plate, or the total area of the apertures as a percentage of the die plate area, may range from about 14 percent to about 55 percent, preferably from about 25 percent to about 45 percent, more preferably from about 38 percent to about 42 percent.

Again if a forming extruder is used, the whole grain brown rice formed pieces may be produced with dimensions for shredding on conventional shredding equipment. For example, the formed pieces may have a cut length of about 1/8 inch to about 1/4 inch, and a diameter of about 3/16 inch to about 5/16 inch imparted by the die apertures.

The extruding pressure, as measured at the die plate, may be from about 200 psig to about 600 psig, preferably from about 400 psig to about 500 psig. The pressures and temperatures employed preferably result in no or substantially no expansion of the extrudate exiting the die orifices. Also, the temperature of the formed pieces exiting the forming extruder should be sufficiently low so that any increase in temperature caused by the shredding operation does not result in deleterious sticking of the shreds to the downstream shredding rolls or compacting rolls.

Generally, the temperature of the shredded product out of the shredding rolls may be up to about 95° F. to about 115° F. without substantial sticking problems. The extruding temperature may be controlled by use of the cooling jackets to provide a formed pieces temperature of from about 80° F. to about 120° F., preferably from about 90° F. to about 110° F., for example from about 95° F. to about 105° F., upon exiting the forming extruder die plate. Cooling air may be supplied at the exit of the plate to cool the exiting formed pieces to help avoid stickiness problems.

When used, the whole grain brown rice formed pieces exiting the forming extruder have a soft, pliable, cohesive texture. In some cases, the extrusion is believed to reverse retrogradation of the tempered whole grain brown rice particles. High shear in the forming extruder, it is believed, substantially fractures retrograded starch granules and releases amylose and amylopectin to increase cohesiveness for shreddability into continuous net-like sheets. While the starch entering the forming extruder may be primarily granular, it may be quite different in the formed pieces exiting the forming extruder. The starch of the whole grain formed pieces produced by the forming extruder is primarily agglomerated starch and fragmented starch with only a small population of individual granules, as determined using light microscopy starch characterization with Lugol's Iodine.

Upon exiting the forming extruder, the cooling of the formed pieces should not be so extensive, and the formed pieces should not be permitted to sit or temper too long, so as to induce substantial starch retrogradation or formed piece hardening which may impede shreddability and affect the texture of the finished product.

The tempered whole grain brown rice or brown rice formed pieces may be transferred by means of belt conveyors and/or bucket elevators to a hopper which feeds a screw conveyor. The latter may transfer the whole grain to a series of shredding rolls or mills via flow tubes or hoppers. An example of such a screw conveyor is that made by the Screw Conveyor Corporation, 704 Hoffman Street, Hammond, Ind., 46327.

Any conventional milling system can be used. A conventional milling system for making a wafer or biscuit may be employed in producing the shredded products such as ready-to-eat cereals, biscuits, and snack chips. The conventional milling system can comprise a pair of closely spaced rolls that rotate in opposite directions with at least one of the rolls having circumferential grooves. Upon passing between the rolls, the composition is formed into long individual strings or strands. A circumferentially grooved roll can also be grooved transversely to the circumferential grooves for the production of a net-like sheet. When sheets are formed, the sheets are comprised of interwoven shreds or strings. When the rolls are held tightly together, the shreds or filaments partially separate from each other but are more or less connected. When the rolls are sprung slightly apart under pressure, the adjacent filaments can be united to each other by very thin webs which stretch between them.

Upon passing between the rolls, the composition is deformed into the circumferential grooves and the optional crosshatching grooves. Each pair of rolls produces a composition layer having a plurality of generally parallel longitudinal strands and optionally a plurality of crosshatching strands generally perpendicular to the longitudinal strands. The crosshatchings and the longitudinal strands form an integral net-like sheet. The texture of each layer may be controlled by the number of crosshatchings in each layer forming the net-like sheets. As discussed more below, the longitudinal crosshatch strands may include a combination of wheat, whole grain brown rice, and/or inclusions. The net-like sheets are preferably unwebbed or webless, i.e., the crosshatchings and longitudinal strands of each layer are not connected by a membrane. The use of an open space within the area formed by the longitudinal strands and the crosshatchings in the outer layers provides a more attractive product. Additionally, use of the open space in the inner layers avoids an excessively dense texture and moisture loss.

The longitudinal strands are produced by the circumferential grooves and may run in parallel with the direction of movement of an underlying conveyor. The crosshatchings of the layer are produced by the crosshatching grooves and may run generally perpendicular to the direction of movement of the conveyor. The shredding mills may be arranged in a linear series along the common underlying conveyor. Each of the shredded layers or sheets may be deposited on the conveyor in super-position, with their longitudinal strands running in the same direction. Conventional shredding systems which can be used in the process are disclosed in U.S. Pat. Nos. 502,378; 2,008,024; 2,013,003; 2,693,419; 4,004,035; and 6,004,612; and Canadian Patent No. 674,046.

The first and last one or more shredded layers to be deposited or laminated may have a number of crosshatchings so as to provide a region of denser texture or higher density in the cracker or chip. The first layer which is laid down upon the conveyor belt preferably has a sufficient number of crosshatchings to provide a more stable bed for the depositing of subsequent shred layers. Additionally, the outside appearance of the product is enhanced by the presence of crosshatchings as is the initial impression of crispness upon eating. For a 5 inch diameter shredding roll, the number of crosshatchings may be about 60 or more, equally spaced about the roll. Five inch diameter rolls may generally have: (1) about 10 to 22 circumferential grooves per inch, and (2) up to about 120, and in other approaches up to 240 equally spaced crosshatching grooves per inch. Larger or smaller diameter rolls may also be used with about the same frequency of grooves as the five inch diameter rolls.

In one approach, the whole grains are passed through two to six shredding heads with 120-grooved rolls to produce a desired number of layers. In other approaches, the shredding heads have 240-grooved rolls.

The layers which are deposited between the outer layers providing a denser texture or higher density may have a decreased number of crosshatchings so as to provide a region of lighter texture or lower density in the interior of the chip. The number of crosshatchings in each layer may be the same or different.

In at least one embodiment, at least 30 percent of the total number of net-like sheets may provide one or more regions of dense texture or higher density. In preferred embodiments, each layer has the same number of cross-hatchings. In at least one embodiment, for increased durability, crispness, and visual appearance, up to 120 cross-hatchings for a five inch diameter roll is used. In other approaches, up to 240 cross-hatching for a five inch diameter roll is used.

The depth of the circumferential and cross-hatching grooves of the shredding rolls may be from about 0.010 inch to about 0.10 inch, preferably from about 0.016 inch to about 0.075 inch. For example, in preferred embodiments the cross-hatching groove depth may be about 0.018 inch and the circumferential groove depth may be about 0.075 inch. Groove depths of less than about 0.010 inch tend to require too many layers to achieve a desired weight per piece. The net-like sheets when laminated upon one another, do not necessarily line up exactly so that one layer is superimposed exactly on another layer. The greater the number of layers, the more likely the openings in one net-like sheet will be at least partly covered by the shreds of another net-like sheet. Thus, increasing the number of layers to achieve a given piece weight tends to result in a denser laminate and loss of shred integrity upon compression in compression rolls. The use of groove depths greater than about 0.10 inch tends to result in too dense of a laminate which is difficult to bake or fry into a crisp, chip-like texture.

Generally, the total number of net-like sheets may range from 1 to 21 depending upon the type and size of shredded product. For example, large sized ready-to-eat breakfast cereal biscuits or wafers may contain from about 1 to about 21 net-like sheets, preferably from about 1 to about 21 net-like sheets. Smaller sized ready-to-eat cereal biscuits or wafers may contain from 1 to 7, preferably from 1 to 6 net-like sheets. The snack chips may have 1 to 7, preferably 1 to 5, most preferably 4 to 5 net-like sheets. If the number of sheets is less than two, continuous, consistent production tends to be disrupted. The laminate tends to stick to or slip on the belt or compression roll upon substantial compression of a laminate which is relatively thin prior to compression. Additionally, with too few layers, the fried or baked product tends to be too fragile for handling on mass production packaging equipment or for dipping. If the number of sheets or layers is greater than seven, upon compression to achieve a desirable, chip-like thinness, the laminate becomes too dense and difficult to bake or fry into a crispy texture. In addition, excessive compression may result in a loss of a distinctive, shredded appearance.

In at least one embodiment, the whole grain brown rice laminate may be compressed in accordance with the method and apparatus of U.S. Pat. No. 6,004,612 to Andreski et al. for "Production of Shredded Snacks with Chip-Like Appearance and Texture," the disclosure of which is herein incorporated by reference in its entirety. The apparatus and method of U.S. Pat. No. 6,004,612 may be used to obtain a whole grain shredded chip-like snack having a substantially uniform shredded net-like appearance and crisp, shredded texture by substantially compressing a laminate of whole grain net-like sheets of whole grain forming pieces obtained in accordance with the present methods. As disclosed in U.S. Pat. No. 6,004,612, the compression substantially reduces or eliminates air pockets or interlayer spacing and enhances interlayer adhesion so as to prevent the development of a puffed, pillowed, or thick biscuit or cracker-like appearance. In some cases, corrugated compression rolls result in a stronger product and unique surface appearance.

Even though the laminate undergoes substantial compression, substantially flat, unpuffed, chip-like products exhibit a substantially uniform shredded, net-like appearance upon their major surfaces. Additionally, individual shred layers are visually discernible in the baked or fried product when it is broken and viewed in cross-section. The strength of the laminate is sufficient to continuously undergo cutting, transferring, and packaging operations during mass production without tearing or breaking. Baked or fried chip-like shredded snacks are sufficiently strong for dipping into and scooping of dips or sauces without breaking. Additionally, chips made according to this process have a whole grain appearance, with portions of the hull or bran of the whole grains being visually apparent in numerous locations on the surface of shredded snack chips.

By some approaches, prior to compression, the thickness of the whole grain laminate may generally range from about 0.035 inch to about 0.250 inch. Generally, the thickness of the laminate is reduced by at least about 35 percent, generally from about 45 percent to about 60 percent of its thickness prior to compression. As disclosed in U.S. Pat. No. 6,004,612, compression of the laminate to substantially reduce its thickness may be achieved by passing it between at least one pair of counter-rotating corrugated or smooth compression rolls while it is supported upon and transported by a conveyer belt. Where more than one pair of compression rolls are employed, the total thickness reduction may be approximately equally divided between the pairs of rolls. Use of a single pair of counter-rotating corrugated or smooth compression rolls is preferred for achieving the substantial compression of the laminate.

Supporting the laminate upon a belt while it is being compressed helps to avoid excessive stretching and tearing or sticking of the laminate during compression and transport through the rolls. As disclosed in U.S. Pat. No. 6,004,612, each pair of counter-rotating rolls may comprise a top roll which contacts the top surface of the laminate, and a bottom roll which contacts the bottom surface of the conveyer belt which supports the laminate. The nip or gap between the counter-rotating rolls and their relative rotational speeds are set so as to substantially compress the laminate while avoiding: 1) substantial sticking of the laminate to the upper roll, or 2) substantial movement or slippage of the laminate relative to the belt, either of which would substantially disrupt or distort the shred pattern of the laminate as it is compressed. The bottom roll helps to maintain the linear speed of the separately driven conveyer belt as the top roll compresses the laminate against the top surface of the belt. The rotational speeds of the top and bottom rolls of a pair of counter-rotating rolls may be at least substantially the same, or essentially the same, depending upon the relative diameters of the rolls. If different diameter rolls are used, their rotational speeds, or angular velocities, may be adjusted to provide at least substantially the same linear velocity.

As disclosed in U.S. Pat. No. 6,004,612, the laminate is compressed by the counter-rotating rolls without cutting of the laminate or without molding of the laminate into individual pieces. The compression or thickness reduction is at least substantially uniform across the width of the laminate. The compression provides a thin, cooked, but dough-like compressed laminate and helps to prevent substantial puffing or expansion upon subsequent baking or frying. The thickness of the compressed laminate exiting the nip of the compression rolls is such so as to provide a thin, chip-like appearance upon baking or frying. In some embodiments of the present methods, generally the thickness of the compressed laminate may range from about 0.035 inch to about 0.120 inch, preferably from about 0.050 inch to about 0.100 inch, for example from about 0.060 inch to about 0.080 inch.

Even though the thickness of the laminate is substantially reduced, a substantially uniform shred pattern is visually apparent upon the opposing major surfaces of the baked or fried product. Additionally, at least substantially all, or all of the individual shred layers are generally visible to the naked eye upon breaking a baked or fried piece perpendicularly to its major surfaces. For example, if a baked or fried piece is broken in about half, a cross-sectional viewing of each piece may generally reveal the same number, or substantially the same number, of shred layers or net-like sheets as were present prior to compression.

The moisture content of the laminate prior to compression and after compression is generally at least substantially the same. Moisture contents of the laminate prior to and after compression may range from about 26 to about 40 percent by weight, and in other approaches about 28 percent by weight to about 37 percent by weight. The starch of the laminates may be in the form of agglomerated starch clusters with virtually no individual starch granules, as determined using light microscopy starch characterization with Lugol's Iodine.

The whole grain laminates of shredded strands, layers or net-like sheets may then be cut, and slit using conventional equipment, such as rotary cutters and slitters. Dockering of the laminate is not necessary to prevent puffing or expansion. For at least one embodiment, a non-dockered piece is preferable because it is more chip-like in appearance. Also, dockering of a compressed laminate tends to produce excessively dense portions which are difficult to bake or fry out without scorching.

The cutting operation may partially or completely cut the whole grain laminates into strips. The slitting operation may completely cut or score the strips so as to provide scored strips of unbaked or unfried ready-to-eat cereal biscuits or snacks with the unbaked or unfried biscuits or snacks tenuously connected to each other. The non-compressed or the compressed whole grain laminate may be edge trimmed and then partially cut into shaped pieces by a rotary cutter without substantial generation of scrap or recycle material. Then, the partially-cut laminate may be cut longitudinally in the direction of movement of the conveyer belt, and then transversely to the direction of movement of the conveyer belt without substantial generation of scrap or recycle material. After baking or frying and before or after oil or seasoning addition to the strips, the conveyor movement, etc., breaks apart the scored strips to provide individual pieces of shredded product such as ready-to-eat cereals, biscuits, wafers, or chip-like snacks.

The shape of the shredded products may be square, rectangular, parallelepiped, triangular and the like. Shapes which minimize or eliminate waste or recycle are preferred. A most preferred shape for a chip-like snack is a triangular or substantially triangular shape. As disclosed in U.S. Pat. No. 6,004,612, to essentially eliminate waste, the triangles may be formed using a rotary cutter which cuts the compressed laminate so that the base of each triangle is parallel to the longitudinal axis or direction of movement of the laminate. To reduce breakage during and after cutting, the laminate is preferably cut so that the apex or point of a triangle in one row does not touch or intersect the apex or point of another triangle located in an adjacent row. In preferred embodiments, the cutter may cut the laminate into a plurality of longitudinal rows of triangular-shaped pieces so that the apex of a triangular piece of one row is located at or intersects about the midpoint of the base of a triangular piece of an adjacent row as shown in U.S. Pat. No. 6,004,612.

As disclosed in U.S. Pat. No. 6,004,612, it is also preferable to form or cut the triangular pieces with rounded, blunted or flat corners so as to eliminate sharp points which may break-off during rotary cutting or subsequent slitting or transferring of the cut laminate. For example, vacuum may be used for lifting and transferring a partially cut laminate from one conveyer belt to another. The presence of substantial amounts of broken-off points may clog the vacuum equipment. One or more, preferably all three corners or apexes of the triangular pieces may be rounded, flattened or blunted. For example, to obtain flattened or blunted corners on a substantially equilateral or isosceles triangular shaped piece, each corner may be formed, cut, or shaped at least substantially parallel to its opposing side or at least substantially perpendicular to an adjacent side by the rotary cutter.

The cut, whole grain laminate may be baked, fried, and/or toasted in conventional equipment. Suitable ovens for baking the cut laminate include Proctor & Schwartz, Werner-Lehara, Wolverine and Spooner ovens containing forced air and gas fired burners and a conveyor. Suitable equipment for frying includes Heat and Control, FMC/Stein oil fryers. The laminates may be toasted to enhance the flavor and brown the edges of the shredded products. Baking or frying of compressed laminates does not substantially puff or expand them and provides a substantially flat, thin, chip-like appearance.

Temperature profiles used for baking, frying or toasting of the laminated preforms may generally be within the range of about 350° F. to about 550° F. Other temperatures may also be appropriate. The baking may be performed in a zoned oven using low oven velocity to avoid excess curling, separating or warping of the strips during baking. The total time for baking, frying and/or toasting may be such so as to avoid browning (except on the edges of the pieces). In some cases, it depends upon the number of shred layers, the size of the shredded product and the type of oven. The total time for baking, frying and/or toasting may range from about 3 minutes to about 10 minutes, but may vary depending on other factors. The cut, whole grain laminate may be fried and toasted in conventional frying and toasting equipment. Heat and Control of Hayward, Calif., and FMC/Stein of Sandusky, Ohio, make suitable fryers, which may have direct or indirect heated oil and a conveyor. The temperature profiles used in the fryer for frying and/or toasting may generally be within the range of about 300° F. to about 400° F., but may vary as needed for particular applications. The total time for frying and/or toasting may be less than about 3 minutes, for example, and the final moisture of the resulting product may be about 1 to about 4.5 percent by weight, and in other approaches about 1 to about 3 percent by weight. In some instances, if the moisture of the resulting product is above about 4.5 percent by weight, then crispness may suffer; and if the moisture is less than about 1.5 percent by weight, then in some instances, the product may have excessive oiliness, a darker color, and a scorched flavor. After baking or frying, the starch of the products may be in the form of agglomerated starch clusters with virtually no individual starch granules, as determined using light microscopy starch characterization with Lugol's Iodine.

In some approaches, the post baking texture of the baked product is about 1500 to about 5,500 gmf, and in other approaches about 700 to about 5,500 gmf. An exemplary analyzer includes the Texture Analyzer TA-XT2 or Instron. The color of the final baked or fried product may be a substantially uniform off-white to golden tan color. The product may be topped with seasoning, salt, or other applications (for example, about 0.5 to about 6 weight percent, based on the total product weight) prior to baking or frying. The salt provides flavor and flavor enhancement. Some of the salt (NaCl) can be replaced with KCl or other salt substitutes.

Fat or shortening, when used, can be applied, preferably by spraying in oil form, to the top and bottom surfaces of baked or fried strips of snacks having no added fat or having only fat inherent in the cereal grain. The topical application of oil to baked or fried snacks having no other added fat may result in baked or fried products having a total fat content of about 5 percent by weight to about 15 percent by weight. A result of the oiling application is a change in texture of the oiled baked product to about 1000 to about 5,000 gmf is expected, and in other approaches about 500 to about 5,200 gmf is expected. Optionally, use of a hydrocolloid gum may provide a slippery or smooth mouthfeel and a glossy appearance even with no added fat.

Whole grain brown rice shredded products may contain one or more additives (e.g., vitamins, minerals, colorants, flavorants, etc.) at effective levels of concentration. Exemplary thereof are sugars such as sucrose, fructose, lactose, dextrose, and honey, polydextrose, dietary fiber, protein, cheese powders, fruit pieces and powders, vegetable pieces and powders, seeds, fillers (sweet or savory), cheese topping, seasonings and inclusions, such as onion, garlic, parsley, and bouillon, malt, wheat germ, nuts, cocoa, flavorants such as fruit flavoring, cracker flavoring, cinnamon, and vanilla flavoring, acidulants such as citric acid and lactic acid, preservatives such as TBHQ, antioxidants such as tocopherol and BHT, food colorant, emulsifiers such as Myvatex (a blend of distilled monoglycerides manufactured by Eastman Kodak), sodium stearoyl lactylate, lecithin, and polysorbate 60, and vitamins and/or minerals. Examples of suitable vitamins and minerals include B-complex vitamins, soluble iron compounds, calcium sources such as calcium carbonate, vitamin A, vitamin E, and vitamin C. Also, non-fat dry milk solids (i.e., milk powder) or soybean protein may be added in an amount sufficient to create a final protein level of from about 10 to about 20 weight percent. Such additional ingredients may range up to about 30 weight percent, based on the total dry weight of the final product. Other sweet and/or savory products may also be included.

Additives, such as vitamins and minerals, may be dry blended with an optional hydrocolloid gum and then the dry blend may be admixed with the cooked, tempered whole grain particles. In other embodiments, enrichment with vitamins and minerals and/or other additives may be achieved by blending with the blended grain and optional gum mixture. For example, a dry multi-vitamin premix may be added with simultaneous mixing to a gum coated grain mixture at the entry of a screw conveyor to form a homogeneous composition. The resulting composition may be fed or dropped into a hopper, which supplies milling rolls. The multi-vitamin and optionally gum-coated grain composition may then be milled in shredding rolls and formed into shredded products.

Additives or fillings, particularly those which may adversely affect shredding, may also be incorporated into the shredded baked or fried goods by depositing them between shred layers during formation of the laminate. Sucrose, fructose, lactose, dextrose, polydextrose, fiber, milk powder, cocoa, and flavorants are exemplary of additives which may be deposited. Exemplary fillings for inter-shred layer deposition include fruit paste fillings, savory fillings, no-fat cheese powder fillings, confectionery fillings, and the like. The additives or fillings may be full-fat, no-fat, reduced-fat, or low-fat.

Additives may also be topically applied to the laminated structure before or after baking or frying. In the production of whole grain shredded snacks, additives are preferably topically applied rather than applied between layers so as to not adversely affect a thin, chip-like appearance. Topically applied oil may be used as a carrier for one or more additives, such as flavorants or seasonings. Topical application of additives may be achieved using conventional dispensing apparatus such as disclosed in U.S. Pat. No. 5,707,448 to Cordera et al., the disclosure of which is herein incorporated by reference in its entirety.

In some approaches, products of the present methods may have a moisture content of less than about 5 percent by weight, in some cases, about 0.5 to about 4.5 weight percent, and in other cases, about 1 to about 2 weight percent, based on the total weight of the baked or fried, finished product. The final product may be baked or fried to a shelf stable relative humidity or "water activity" of less than about 0.3, in other approaches, less than about 0.2. It may have a shelf stability of at least about 2 months, preferably at least about 6 months, when stored in proper, sealed packaging.

According to another form, additional materials or inclusions, such as sweet potato and/or legumes, such as whole red beans, may also be incorporated into the process, such as shown in FIG. 3 to produce a food having a distinctive appearance and/or texture. These additional materials may include vegetables, legumes, pulses and the like. For example, tuber vegetables such as potato, sweet potato, cassava, yam and combinations thereof may be used. Additionally, legumes such as red beans may also be used. In addition to whole red beans, other whole beans may also be used including, but not limited to, black, navy, kidney, pinto, mayocoba, pink, great northern, and chick pea/garbanzo beans. Further, lentils, such as red and green, may also be used. These materials may take a variety of forms including, but not limited to, whole, ground, dry, pieces, grits, powder and the like.

Figure 16:
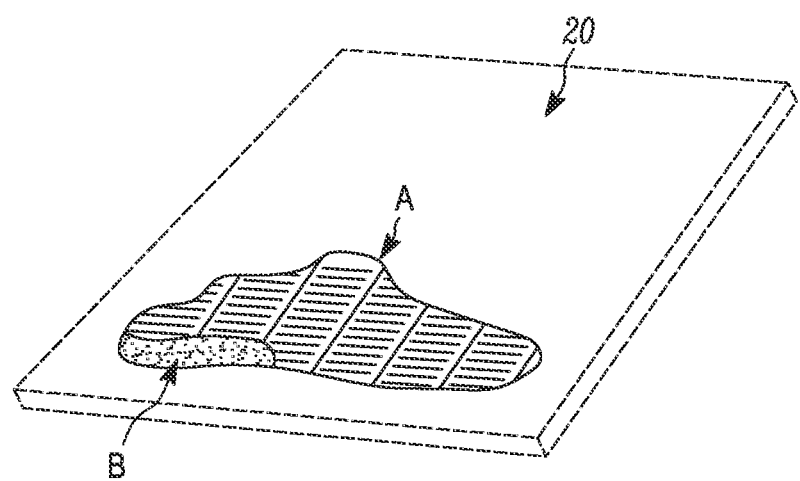
FIG. 16 is a perspective view of a shredded product.

For example, a cracker or a snack product may be produced having at least one variegated or marbled outer surface or one or more variegated or marbled strands including discretely identifiable inclusions that maintain at least a portion of its product identity, structure, and/or physical consistency of the inclusion. That is, for example, if the inclusion is a vegetable piece, it maintains at least a portion of its size, shape, color and/or piece integrity so that it remains visually identifiable as the vegetable in and/or on the finished cracker product. For example, in one form, the product may be variegated or marbled in that the inclusions are a different color than the remainder of the product and may otherwise be identifiable as a different component. By one approach, for instance, the food or snack product may include a surface and/or a strand (as well as internal portions) with a continuous net-like shredded portion A as well as a second portion B with a non-net-like shredded area provided by the inclusions. See, for example, FIG. 16. In some approaches, the inclusions may cover or fill in any spaces or gaps between the net-like shreds. In other approaches, the inclusions may extend through one or more individual shreds without spanning the spaces or gaps between the net-like shreds.

In one aspect, the marbled surface may include a cracker or shredded portion formed of a cooked mass and an inclusion portion smeared, spread or streaked about at least one of the outer surfaces (or strands) and wherein the inclusion maintains characteristics and identity of the inclusion source and has a contrasting color, texture, appearance and/or taste when compared to the shredded portion. The cooked mass and inclusion composition may be combined such that at least a portion of each of the cooked mass and the inclusion composition are visible on the marbled surface. In one form, the inclusion composition forms at least one contiguous inclusion smeared or otherwise covering at least about 1 to about 5 percent of the outer surface area of a final product surface. In another form, the inclusions could cover from about 5 to about 50% of the total outer surface area of one side of the final product's outer surface to form a shredded and marbled appearance. The above coverage levels, if the inclusion does not span gaps in the net, it independent of any open space in a net-like sheet. In another form, some of the inclusions may extend over a portion of the final product or snack product outer surface to define the marbled appearance and, at the same time, extend internally to the final product, individual strand, and/or the entire snack product. In another form, some inclusions may form a portion of the marbled surface on both sides of the product (or strand) and extend through the final product or snack body (or strand) at the same time. In yet another form, the product may have both inclusions forming a marbled surface as well as whole inclusions contained within the body of the product that are not smeared on a surface.

Further, the inclusions may have a contrasting color when compared to the shredded composition of the remainder of the product. For example, the shredded portion may have a generally light color whereas the inclusions may have a dark color such as red, orange or green. Additionally, the inclusions may provide not only color contrast but also unique texture and taste profile. Furthermore, the inclusions may enhance the nutrition of the product by way of vitamins, minerals, and other micro nutrients. In one form, the inclusions give the product a generally marbled appearance that may be more attractive and believable to consumers. Further, the marbling-appearance enhances consumer appeal and nutritional properties.

In another aspect, the product may be processed in a variety of different ways and may include various combinations of different ingredients. In one form, a vegetable composition, such as sweet potato, may be included as granules, pieces, or particles in the inclusion composition. In this regard, the vegetable composition may be a dehydrated material that is then rehydrated when combined with a partially cooked mass before further cooking.

The embedded inclusions in the shredded product are effective to give the marbled appearance. By one approach, the inclusions are initially dehydrated and hydrated during processing to an effective moisture content that is suitable to sufficiently soften the inclusions but still allow the inclusion to generally maintain its physical particle identity when processed and shredded. The hydrated inclusions are conditioned and then shred along with the other ingredients to form the marbling and/or streaking. By one approach, the inclusions may include pieces of vegetables with high levels of sugar, such as pieces of root vegetables including potato, sweet potato, cassava, yam, beet roots, carrots, and the like. The inclusions may also include other types of vegetable pieces with high levels of sugar and may include pieces of legumes such as beans, peas, and the like. For example, the inclusion may include whole red beans and/or red bean grits. In other cases, the inclusions may include pumpkin, squash, and zucchini, and mixtures thereof. It should be noted that the inclusions may be prepared from materials that are whole (with skin) or non-whole (without skin).

Figure 4:
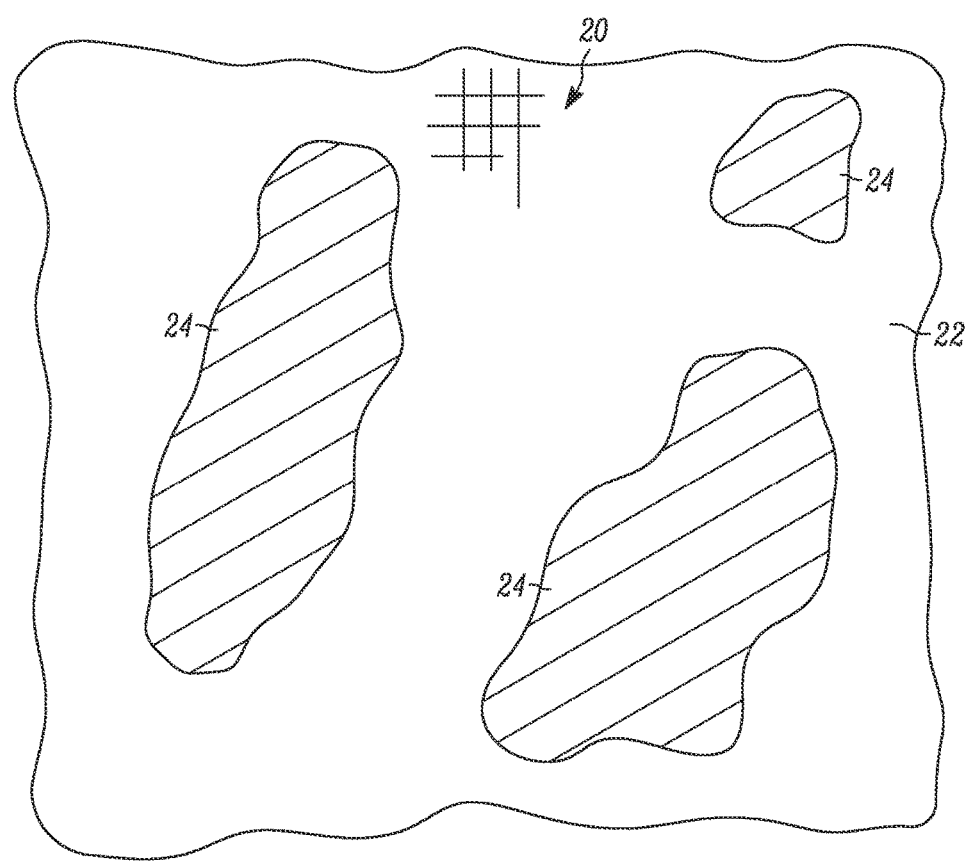
FIG. 4 is a top view of one form of a shredded product.

Referring to FIG. 4, in one form, a shredded product 20 may include a main body portion 22 having a continuous net-like appearance, such as a light color along with a cross-hatched texture obtained from the shredding and lamination. The main body portion 22 may contain materials having a fairly consistent color when cooked, such as brown rice, whole wheat and the like. Inclusions 24 may have a contrasting appearance when compared with the main body portion 22 of the product 20 and may extend between within individual strands or crosshatching and/or the net-like structures of the main body portion 22. The inclusions 24 may extend between one or more of the net-like shredded portions of the main body portion 22. For example, the inclusions 24 may have a dark color, such as red, orange, brown or green depending on the source of the inclusion. Further, the inclusions 24 may have a different texture when compared with the main body portion 22. However, it should be understood that the inclusions 24 may have any contrasting appearance when compared with the main body portion 22 appearance. In one form, the inclusions 24 have a size and a shape such that they remain visually identifiable and maintain at least a portion of its physical integrity from the source providing the inclusion.

The inclusions 24 may also have an expanded, elongated, or smeared-type or speckled or variegated appearance on the outer surface of the product or strand such that the edges of the inclusions 24 are ragged and not necessarily smooth. That is, the inclusions 24 may not be aligned with the shreds and have a random configuration. So formed, and in some approaches, the inclusions 24 may still retain an integrity of its source material so that the inclusions still maintain a contiguous portion thereof. Additionally, the inclusions 24 need not have a solid color, but instead may have color variations along with other colors interspersed therein. For example, the inclusions 24 may have a generally orange or red color, but may also include darker spots which may be indicative of deeper inclusions. The color differences may vary within a single inclusion 24 and may also vary from amongst the plurality of inclusions 24. Similarly, the texture of the inclusion 24 may also vary within a single inclusion 24 and may also vary amongst the plurality of inclusions.

Figure 5:
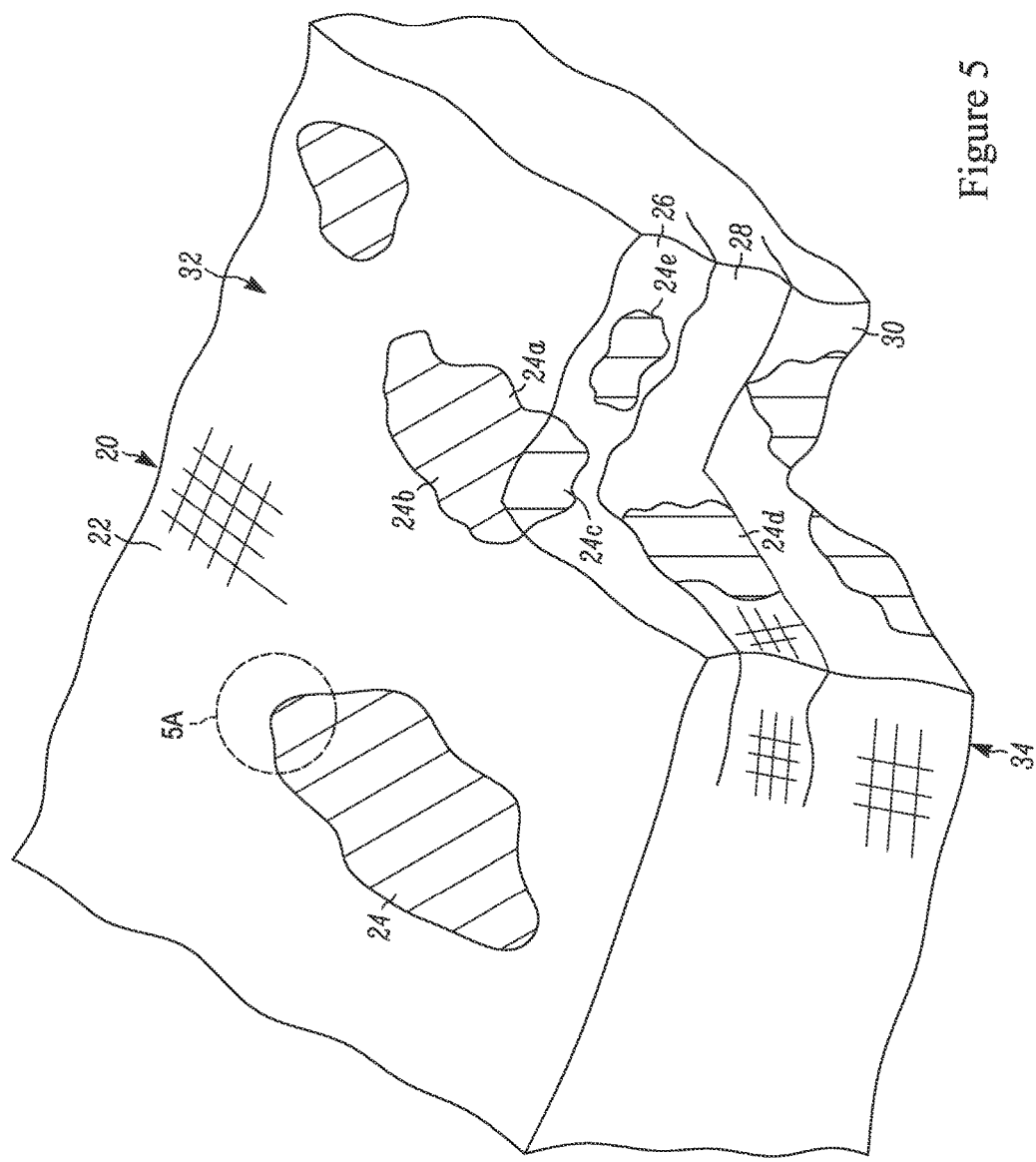
FIG. 5 is a perspective cross-sectional view of the shredded product of FIG. 4.

FIG. 5 is a cross-sectional view of one exemplary snack product 20. While the product 20 in FIG. 5 shows the product 20 as being generally solid, it should be understood that the product 20 is actually shredded such that each of the structures shown therein has a net-like appearance. A more detailed form of the net-like appearance is shown in FIGS. 5A and 6-15.

As seen in FIG. 5, in one form, the product 20 includes three exemplary layers 26,28,30. More or less layers may be used as desired in an application. As shown in the cross-section, in one form, the inclusions 24 may not only extend about an outer surface of the product 20, but one or more of the inclusions 24 may also extend at least partially internally into and/or through any one of the shredded layers 26,28,30. For example, inclusion 24a may have a portion 24b that is smeared about the outer surface and the same inclusion 24a may also have a portion 24c that is embedded or extends internally to the product body. However, some of the inclusions, such as inclusion 24d shown in FIG. 5 may extend from one side of layer 28 through the layer to a second side such that the same inclusion 24d would extend to both sides of layer 28. In other cases, some of the inclusions, such as inclusion 24e, may be wholly contained within the body of a layer. The product 20 may contain any combination of the various types of inclusions.

The inclusions 24 are generally un-evenly sized pieces, granules, or particles of vegetables as described above. By one approach, the pieces may have a size characterized as a −3+10 US standard mesh size. That is, 100 percent of the pieces may fall through a US 3 standard mesh and 100 percent of the pieces may be retained in a US 10 standard mesh sieve. In another approach, the unevenly sized pieces may vary in size from about 1/16 inch to about 1/4 inch; however other sizes may be used depending on the application, vegetable, or other inclusion. Further, the inclusions 24 may cover about 5 to about 50 percent of the exposed surface area of the first side 32 and/or the second side 34. In other approaches, the inclusions may also be shredded.

Figure 5A:
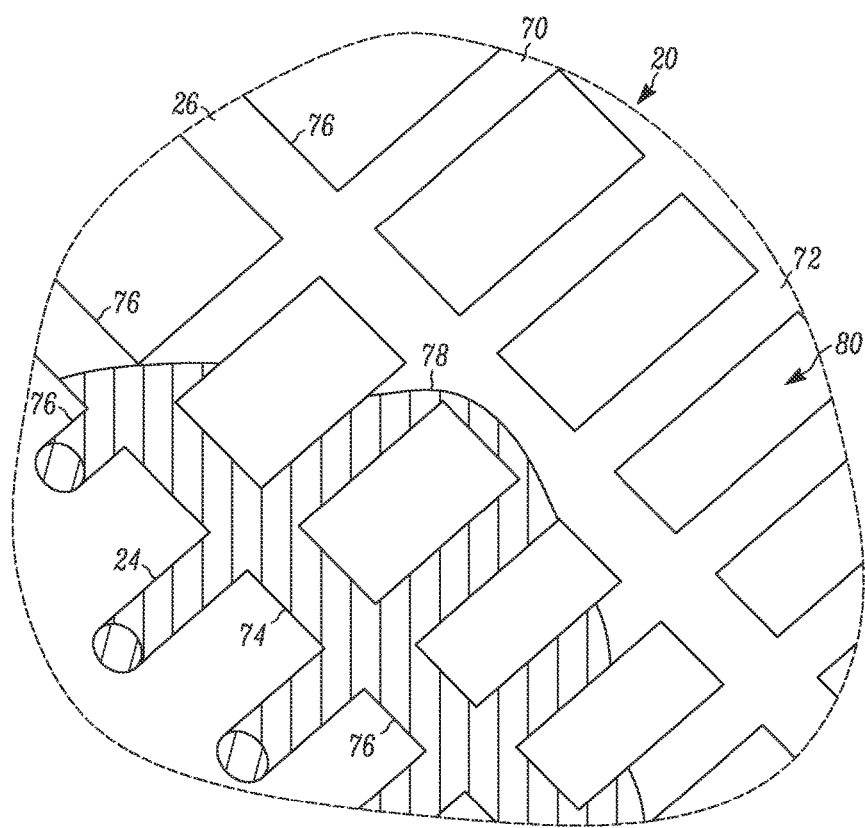
FIG. 5A is an enlarged section of a portion of FIG. 5.

Referring to FIG. 5A, which is an enlarged section of the identified portion of FIG. 5, a more detailed view of the product 20 is shown whereby the details of the shredded appearance and/or texture are depicted. Generally, the product includes a plurality of net-like sheets 70 which form the various shredded layers 26,28,30. The top-most net-like sheet 70 is shown in FIG. 5A, but layers 28,30 may also include similar net-like sheets. The net-like sheet 70 includes a low or non-glutenous component 72 having a first overall color. It should be understood that there may be some variations in the first overall color, including flecks of darker and/or lighter colors, the overall color of the low or non-glutenous component 72 is generally the same.

The net-like sheet 70 also includes an inclusion component 74, such as from sweet potatoes, beans and the like as discussed above. The inclusion component 74 has a second overall color that is different from the first overall color. The second overall color may also include some variations in specific locations, such as flecks of lighter and/or darker color, as well as streaking. However, in one form, the overall color of the inclusion component 74 is generally the same.

The net-like sheet 70 is defined by interconnected strands and/or crosshatching strands 76 formed by one of the low or non-glutenous component 72, the inclusion component 74 and combinations thereof. As shown in FIG. 5A, the stands 76 include both the low or non-glutenous component 72 and the inclusion component 74. In fact, the low or non-glutenous component 72 and the inclusion component 74 are coupled to one another at a boundary area 78. The combination of the low or non-glutenous component 72 and the inclusion component 74 on the net-like sheet 70 provides a marbled appearance by a combination of the low or non-glutenous component 72 and the inclusion component 72 on the same strand 76 as well as on adjacent strands 76. As shown in FIG. 5A, the sheet 70 may also define spaces and/or gaps 80 formed by the intersection of the strands. As shown, the gaps 80 may be free of the inclusions, which may be associated with individual strands. In other approaches (not shown), the inclusions may extend into the gap 80 and span, at least partially or fully between adjacent strands.

By one approach, an effective inclusion to form a marbled appearance may also be related to the size and thickness of the product and/or layers therein. For instance, the size of the inclusion may be related to the cross-sectional thickness of the final product or layer. Thus, an inclusion ranging in size characterized by the mesh sizes above or from about 1/16 inch to about 1/4 inch may be used in a product having a final thickness of about 0.08 inches to about 0.2 inches in order to achieve the desired marbled appearance. If the inclusion is too small or the product is too thick, then the inclusion may not form the marbled appearance because it may not have sufficient inclusion portions exposed on the outer surfaces. Thus, in one approach, the marbled product may have a marbling ratio of inclusion size to cracker thickness of about 0.7 to about 1.5 in order to achieve the desired marbled surface effects.

As mentioned above, the inclusions may be root vegetables such as sweet potatoes, carrots, beets, and the like. The inclusions may also be legumes such as peas, beans, and the like. In one form, the vegetables generally include effective levels of starch, sugar, and fiber that enable the vegetable to sufficiently hydrate and soften to enable smearing or spreading on the product surface and between the shreds, but at the same time, the starch, sugars, and fiber also enable to the inclusion to retain its structural integrity and/or its product or piece identity after hydration and smearing.

It should be noted that the foods having a marbled appearance can be produced according to the process shown in FIG. 3. In this regard, when compared to the processes shown in FIGS. 1 and 2, the process in FIG. 3 generally includes a two stage pressure cooking operation. By utilizing a two stage pressuring cooking operation, sufficient pressure cooking can be provided for the rice and/or wheat components while avoiding degradation and/or denaturation of the vegetables, such as sweet potatoes, legumes, and the like. An initial first stage pressure cooking occurs for about 10 to about 30 minutes at about 5 to about 25 psi and then a second pressure cooking stage for about 2 to about 10 minutes at about 5 to about 25 psi are combined to provide the desired properties to the resulting composition and final product when including the inclusions described herein and when used in a downstream shredding operation.

More specifically, a low or non-glutenous component, such as rice 40 is combined with water 42 to form an uncooked mass. The uncooked mass is partially cooked in a first cooking process, such as pressure cooker 44a, to form a partially cooked mass. The pressure from pressure cooker 44a can be exhausted to allow combination with additional ingredients. For example, the partially cooked mass is combined with an inclusion component, such as inclusions 70, to form an inclusion mass. This inclusion mass can be mixed, such as in pressure cooker 44b, where it is cooked to form a fully cooked mass. The fully cooked mass can then be tempered in tempering unit 50 to form a tempered material. Next, the tempered material can be shredded, such as in shredder 56, to form continuous net-like sheets having a marbled appearance defined by a first portion of the continuous net-like sheets with the low or non-glutenous material having a first overall color and a second portion of the continuous net-like sheets with the inclusion component having a second overall color different from the first overall color. Examples of the resulting product are shown in FIGS. 4-16.

In yet another form, a multi-layer food may be provided where layers having inclusions are introduced and combined with layers which do not have inclusions. For example, an internal layer, such as a filler layer, may include substantially more inclusions than an external or surface layer. Alternatively, the surface layer may have a substantially more inclusions than the internal layer(s).

Figure 7:
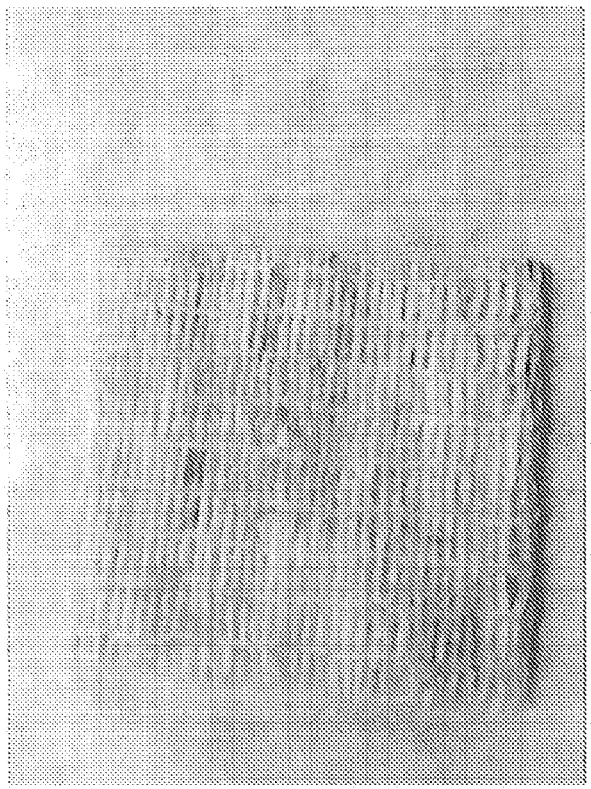
FIG. 7 is an enlarged view of one of the products of FIG. 6.
Figure 6:
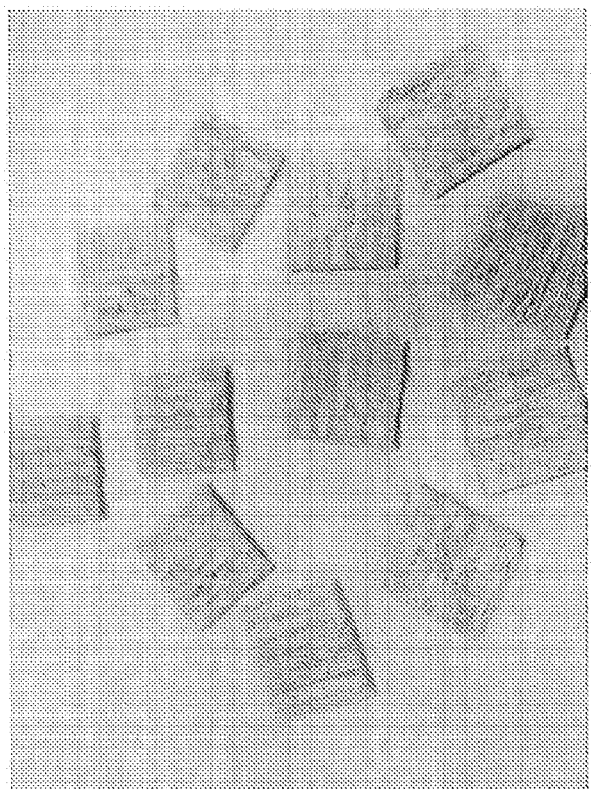
FIG. 6 is picture of one form of a plurality of shredded products.
Figure 9:
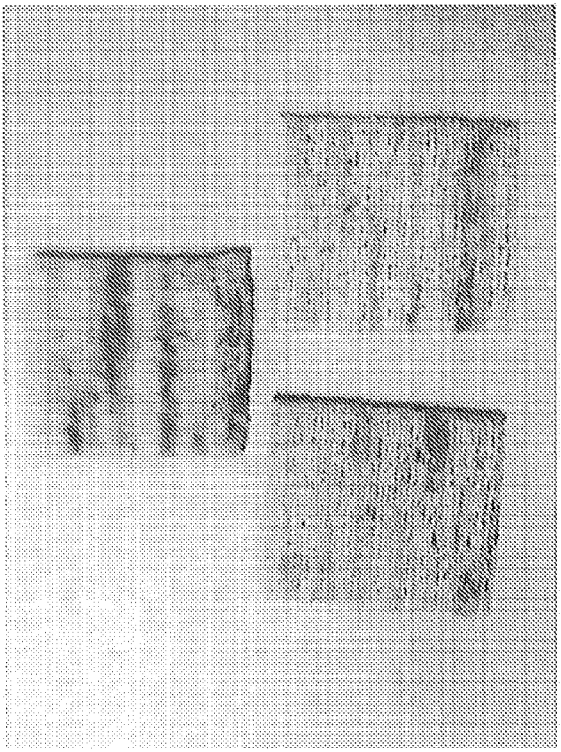
FIG. 9 is an enlarged view of the shredded products of FIG. 8.
Figure 8:
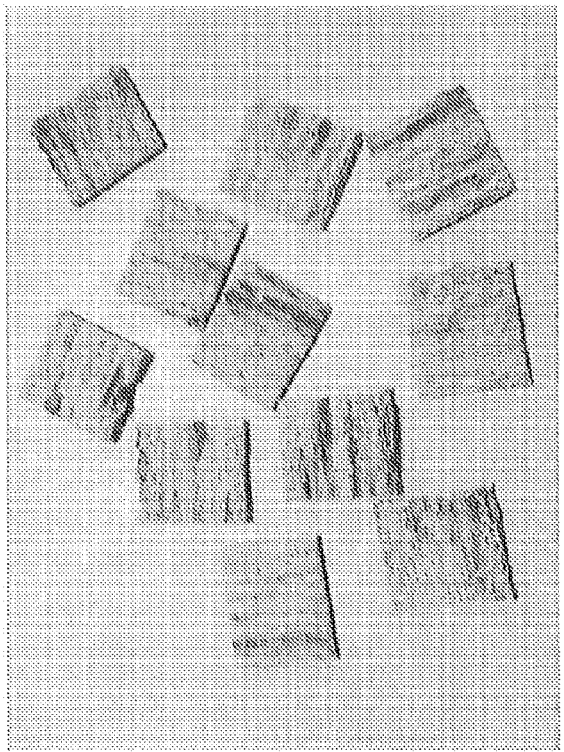
FIG. 8 is a picture of an alternative form of a plurality of shredded products.
Figure 10:
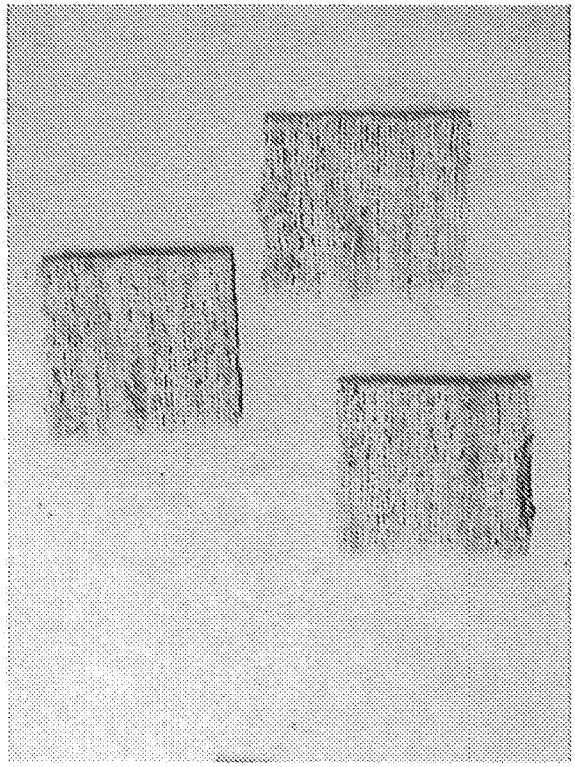
FIG. 10 is an enlarged view of the shredded products of FIG. 8.
Figure 11:
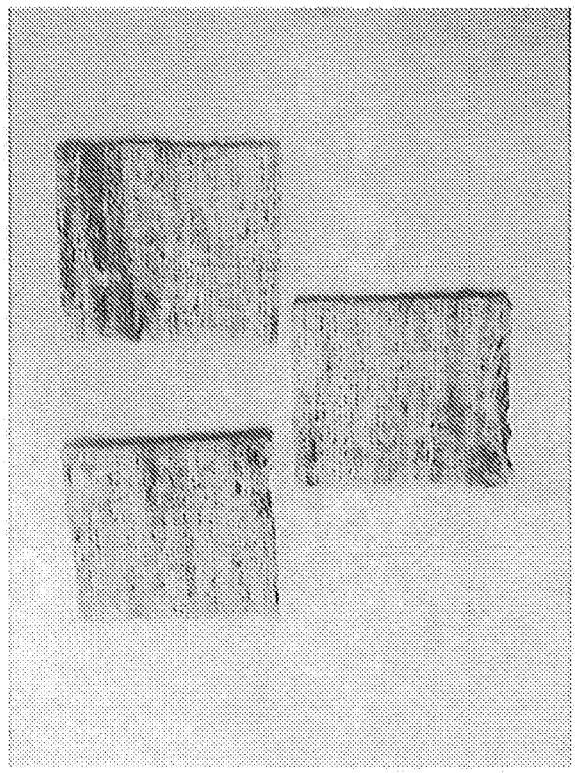
FIG. 11 is an enlarged view of the shredded products of FIG. 8.
Figure 12:
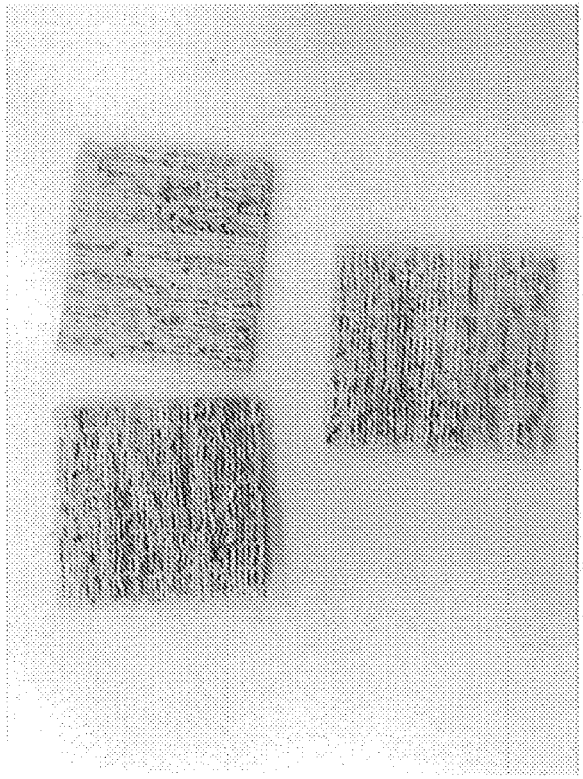
FIG. 12 is a picture of another alternative form of a plurality of shredded products.
Figure 13:
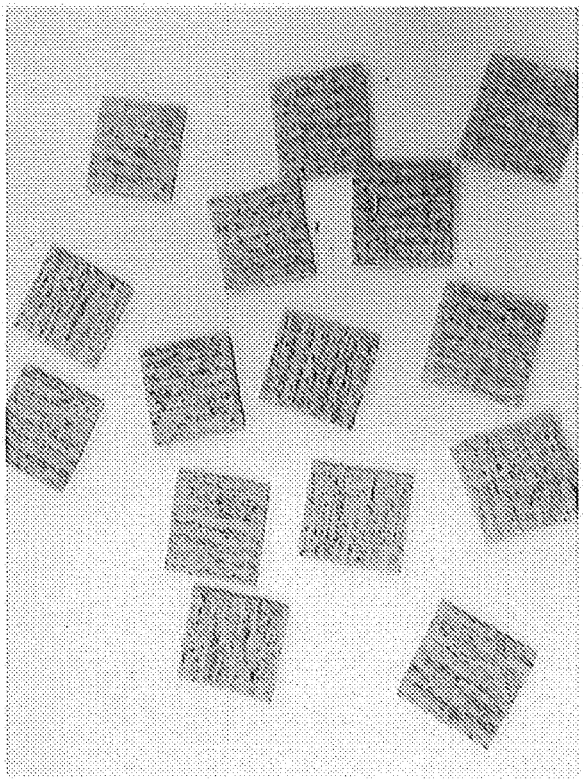
FIG. 13 is an enlarged view of the shredded products of FIG. 12.
Figure 14:
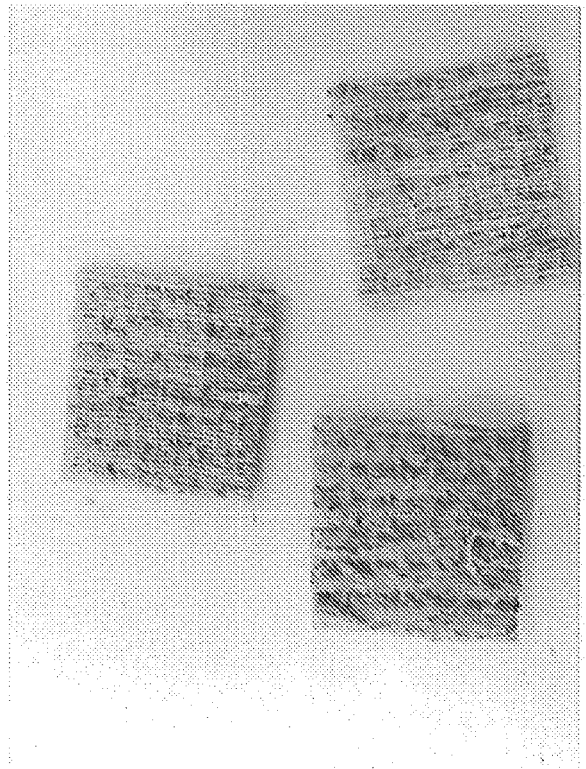
FIG. 14 is an enlarged view of the shredded products of FIG. 12.
Figure 15:
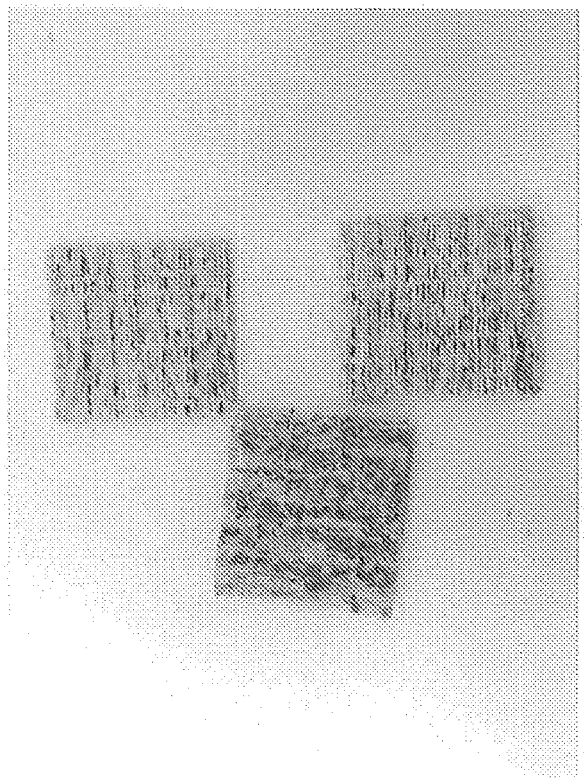
FIG. 15 is an enlarged view of the shredded products of FIG. 12.

Pictures of various forms of shredded products having different ingredients are shown in FIGS. 6-15. For example, FIGS. 6-7 show brown rice and wheat products produced generally according to the process in FIG. 1. As seen in FIGS. 6 and 7, the resulting products have a fairly uniform appearance with minor variations in color and/or texture.

FIGS. 8-11 show brown rice, wheat and sweet potato products produced generally according to FIG. 3. As seen in these figures, the products have distinct variations in color and/or texture relative to the overall composition as a result of the inclusion of sweet potato. The inclusions shown in these figures are fairly large and continuous.

FIGS. 12-15 show brown rice, wheat and red bean products produced generally according to FIG. 3. As seen in these figures, the products also have distinct variations in color and/or texture relative to the overall composition as a result of the red beans. However, when compared to the sweet potato products in FIGS. 8-11, the inclusions are somewhat smaller and less continuous due to the particle size and cohesiveness of the red beans compared to the sweet potato used in the products.

In some approaches, exemplary formulas may be found in Table 3.

TABLE 3

| | Compositions | | |
|---|---|---|---|
| Ingredients | Brown Rice | Bean | Sweet Potato |
| Brown rice, % | 71.7-75.2 | 66.0-69.2 | 66.0-69.2 |
| Whole wheat, % | 9.3-9.8 | 9.3-9.8 | 9.3-9.8 |
| Sweet potato pieces with skins, % | 0 | 0 | 5.7-6.0 |
| Whole red bean grits, % | 0 | 5.7-6.0 | 0 |
| Topping Salt/Seasoning, % | 1-5 | 1-5 | 1-5 |
| Oil, % | 14 | 14 | 14 |
| Total | 100 | 100 | 100 |

It should be noted that a range of each of the materials may be included in the composition. For example, the composition may include about 50 to about 90 wt. % brown rice, about 5 to about 15 wt. % wheat and about 1 to about 15 wt. % of each vegetable and/or inclusion type. For example, the composition may include inclusions, such as from about 2 to about 10 wt. % red beans and/or about 2 to about 10 wt. % sweet potato. The other components in the composition may also be included in a variety of ranges as discussed above.

The following examples further illustrate the disclosed methods and products wherein all parts and percentages are by weight and all temperatures are in degrees Fahrenheit, unless otherwise indicated.

EXAMPLES

Example 1

This Example studied test of whole grain brown rice shredded products. Results are provided in the Table of Appendix 1. Samples were tested using a crisp fracture rig comprised of a circular support and 0.25 inch diameter spherical probe. Ten-piece height was measured with caliper. Number of pieces after test (fracture): 1=probe pierces sample, 2=sample breaks into 2 pieces, 3=sample breaks into 3 pieces, etc. Small number of pieces submitted for each variable. Force should be the key factor to compare sample piece strength/texture; however, both force and distance (at maximum force) may be informative about sample characteristics. Piece dimensions and compactness of structure can influence breaking behavior. There is a range of thickness and 10-piece weight. Variation could reflect differences in structure due to design variable or may be attributable to process control during the trial.

The sample generally included between two and four pieces having a 10-piece weight ranging from 20 to 40 grams and a 10-piece height ranging from 1.5 to 3.5 inches.

Example 2

This Example studied various parameters of a method forming whole grain brown rice products and consumer preferences. Results are summarized in Appendix 2.

Example 3

Example 3 illustrates processing and compositions differences between various forms of shredded products. As show in the tables above, a brown rice and whole wheat sample was prepared generally in accordance with the process shown in FIG. 1 while the brown rice/whole wheat/sweet potato and brown rice/whole wheat/red bean grits samples were generally prepared in accordance with the process shown in FIG. 3. Details of the multistage processing for the latter two samples are described in the Table 3 above.

Example 4

Further examples were prepared as discussed in Appendix 3 to compare formulations and processing conditions.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of Applicants' contribution.

What is claimed is:

1. A method for making a shredded product having a marbled surface, the method comprising:
    combining water and a low or non-glutenous component to form an uncooked mass;
    partially cooking the uncooked mass in a first cooking process to form a partially cooked mass;
    combining the partially cooked mass with an inclusion component to form an inclusion mass;
    cooking the inclusion mass in a second cooking process to form a fully cooked mass;
    tempering the fully cooked mass for about 0 to about 240 minutes to form a tempered material; and
    shredding the tempered material to form continuous net-like sheets comprising individual interwoven shreds, the net-like sheets having a marbled appearance defined by a first portion of the continuous net-like sheets having a first overall color that corresponds to a color of the low or non-glutenous component, and a second portion of the continuous net-like sheets having a second overall color that corresponds to a color of the inclusion component, the second overall color being different from the first overall color.

2. The method of claim 1 wherein at least one of the first and second cooking processes are pressure cooking processes.

3. The method of claim 1 wherein the low or non-glutenous component includes whole grain brown rice and the inclusion component includes at least one of whole red beans and pieces of whole sweet potatoes.

4. The method of claim 1 wherein the inclusion component includes at least one of legumes, beans, tuber vegetables, and fruit.

5. The method of claim 1 further comprising the steps of layering and baking the continuous net-like sheets to form the shredded product having multiple layers.

6. The method of claim 1 further comprising pelletizing the fully cooked mass.

7. The method of claim 1 wherein the first and second cooking processes are both pressure cooking processes and wherein pressure is exhausted between the first and second cooking processes.

8. The method of claim 7 wherein the inclusion mass is mixed to disperse the inclusion component in the partially cooked mass before re-pressurizing for the second cooking process.

* * * * *